(12) United States Patent
Chang et al.

(10) Patent No.: US 11,516,287 B2
(45) Date of Patent: *Nov. 29, 2022

(54) METHOD AND APPARATUS FOR PERFORMING SIMPLE STORAGE SERVICE SEAMLESS MIGRATION USING INDEX OBJECTS

(71) Applicant: Silicon Motion Technology (Hong Kong) Limited, Kowloon (HK)

(72) Inventors: Chi-En Chang, Taoyuan (TW); Kuan-Kai Chiu, Taipei (TW)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 62 days.

This patent is subject to a terminal disclaimer.

(21) Appl. No.: 17/167,095

(22) Filed: Feb. 4, 2021

(65) Prior Publication Data

US 2021/0342086 A1 Nov. 4, 2021

Related U.S. Application Data

(60) Provisional application No. 63/017,001, filed on Apr. 29, 2020.

(51) Int. Cl.
*G06F 3/06* (2006.01)
*G06F 16/21* (2019.01)
(Continued)

(52) U.S. Cl.
CPC .......... *H04L 67/1095* (2013.01); *G06F 3/067* (2013.01); *G06F 3/0622* (2013.01);
(Continued)

(58) Field of Classification Search
CPC .. G06F 16/215; G06F 16/2228; G06F 3/0622; G06F 3/0647; G06F 3/0659;
(Continued)

(56) References Cited

U.S. PATENT DOCUMENTS 11,297,137 B2 * 4/2022 Chang ..................... G06F 21/78
2015/0312117 A1 10/2015 Behera
(Continued)

FOREIGN PATENT DOCUMENTS

CN 110659255 A 1/2020
TW 200728992 8/2007
(Continued)

OTHER PUBLICATIONS

Chang, the specification, including the claims, and drawings in the U.S. Appl. No. 17/677,975, filed Feb. 22, 2022.
(Continued)

*Primary Examiner* — Christopher B Shin
(74) *Attorney, Agent, or Firm* — Winston Hsu

(57) ABSTRACT

A method for performing Simple Storage Service (S3) seamless migration using index objects and associated apparatus are provided. The method includes: in response to a request of migrating user data of a user of the storage server from a remote S3-compatible server into the storage server, during an index stage, utilizing an index-object-based S3 migration management module among multiple program modules running on a host device within the storage server to create and store multiple index objects into a storage device layer of the storage server to be respective representatives of multiple normal objects of the user data at the storage server, and migrate respective Access Control Lists (ACLs) of the multiple normal objects to the storage server to be respective ACLs of the multiple index objects; and during a data stage, utilizing the index-object-based S3 migration management module to trigger one or more migration agents to migrate object data.

18 Claims, 14 Drawing Sheets

(51) Int. Cl.
  *G06F 21/78*      (2013.01)
  *H04L 67/1095*   (2022.01)
  *H04L 9/40*        (2022.01)
  *G06F 16/215*     (2019.01)
  *G06F 16/22*       (2019.01)

(52) U.S. Cl.
  CPC .......... *G06F 3/0647* (2013.01); *G06F 3/0659* (2013.01); *G06F 16/215* (2019.01); *G06F 16/2228* (2019.01); *G06F 21/78* (2013.01); *H04L 63/101* (2013.01); *G06F 2221/2141* (2013.01)

(58) Field of Classification Search
  CPC .. G06F 3/067; G06F 21/78; G06F 2221/2141; H04L 67/1095; H04L 63/101
  USPC ....................................................... 711/154
  See application file for complete search history.

(56) References Cited

U.S. PATENT DOCUMENTS

| | | |
|---|---|---|
| 2019/0129802 A1 | 5/2019 | Laier |
| 2021/0342086 A1* | 11/2021 | Chang ..................... G06F 3/061 |
| 2022/0182445 A1* | 6/2022 | Chang ..................... G06F 3/067 |

FOREIGN PATENT DOCUMENTS

| | | |
|---|---|---|
| TW | 201403452 A | 1/2014 |
| TW | 202006551 A | 2/2020 |
| TW | I685743 B | 2/2020 |
| TW | I709665 B | 11/2020 |

OTHER PUBLICATIONS

Chang, the specification, including the claims, and drawings in the U.S. Appl. No. 17/167,096, filed Feb. 4, 2021.

* cited by examiner

METHOD AND APPARATUS FOR PERFORMING SIMPLE STORAGE SERVICE SEAMLESS MIGRATION USING INDEX OBJECTS

CROSS REFERENCE TO RELATED APPLICATIONS

This application claims the benefit of U.S. Provisional Application No. 63/017,001, which was filed on Apr. 29, 2020, and is included herein by reference.

BACKGROUND OF THE INVENTION

1. Field of the Invention

The present invention is related to memory control, and more particularly, to a method and apparatus for performing Simple Storage Service (S3) seamless migration using index objects, where examples of the apparatus may include, but are not limited to: the whole of a storage server, a host device within the storage server, a processing circuit within the host device, and at least one processor/processor core (e.g. Central Processing Unit (CPU)/CPU core) running one or more program modules corresponding to the method within the processing circuit.

2. Description of the Prior Art

A server may be used for cloud computing. For example, a storage server may be arranged to implement remote storage such as clouds capable of storing data for users. When a user using an old public cloud finds that this public cloud is nearly full or the access speed is slow, the user may need to seek for a new cloud. A data migration method has been proposed in the related art to try copying data from the old public cloud to another public cloud. However, some problems may occur. For example, the data migration method typically copies data first, including all data prior to a start time point in the old public cloud, and performs endpoint switching, etc. afterward, and therefore may erroneously copy data that should be deleted (e.g. the data that has been deleted by the user after the start time point) to the other public cloud. In addition, copying the data first as suggested by the data migration method may need a long time period such as multiple months. More particularly, this data migration method is not suitable for private clouds. If the user would like to use a private cloud as the new cloud, it seems that no proper solution for data migration from the old cloud to the private cloud can be found in the related art. Thus, a novel architecture is required for performing S3 seamless migration regarding private clouds (e.g. S3 seamless migration from any public/private cloud to a private cloud) to allow the user to access data normally and smoothly during data migration.

SUMMARY OF THE INVENTION

It is therefore an objective of the present invention to provide a method for performing S3 seamless migration using index objects, and to provide associated apparatus such as a storage server, a host device within the storage server, etc., in order to solve the above-mentioned problems It is another objective of the present invention to provide a method for performing S3 seamless migration using index objects, and to provide associated apparatus such as a storage server, a host device within the storage server, etc., in order to achieve an optimal performance without introducing a side effect or in a way that less likely to introduce a side effect.

At least one embodiment of the present invention provides a method for performing S3 seamless migration using index objects, wherein the method is applied to a storage server. The method may comprise: in response to a request of migrating user data of a user of the storage server from a remote S3-compatible server into the storage server, during an index stage among multiple stages of the migration of the user data, utilizing an index-object-based S3 migration management module among multiple program modules running on a host device within the storage server to create and store multiple index objects into a storage device layer of the storage server to be respective representatives of multiple normal objects of the user data at the storage server, and migrate respective Access Control Lists (ACLs) of the multiple normal objects to the storage server to be respective ACLs of the multiple index objects, for minimizing probability of any change of any normal object of the multiple normal objects affecting correctness of the migration of the user data, wherein the storage server comprises the host device and the storage device layer, the storage device layer comprises at least one storage device that is coupled to the host device, the host device is arranged to control operations of the storage server, and said at least one storage device is arranged to store information for the storage server; and during a data stage after the index stage among the multiple stages, utilizing the index-object-based S3 migration management module to trigger one or more migration agents to migrate respective object data of a set of normal objects among the multiple normal objects from the remote S3-compatible server into the storage device layer of the storage server as respective replacements of a set of index objects among the multiple index objects, for completing the migration of the user data.

In addition to the above method, the present invention also provides a host device. The host device may comprise a processing circuit that is arranged to control the host device to perform index-object-based S3 migration management in a storage server, wherein the storage server comprises the host device and a storage device layer, the storage device layer comprises at least one storage device that is coupled to the host device, the host device is arranged to control operations of the storage server, and the aforementioned at least one storage device is arranged to store information for the storage server. For example, in response to a request of migrating user data of a user of the storage server from a remote S3-compatible server into the storage server, during an index stage among multiple stages of the migration of the user data, an index-object-based S3 migration management module among multiple program modules running on the processing circuit creates and stores multiple index objects into the storage device layer to be respective representatives of multiple normal objects of the user data at the storage server, and migrates respective Access Control Lists (ACLs) of the multiple normal objects to the storage server to be respective ACLs of the multiple index objects, for minimizing probability of any change of any normal object of the multiple normal objects affecting correctness of the migration of the user data; and during a data stage after the index stage among the multiple stages, the index-object-based S3 migration management module triggers one or more migration agents to migrate respective object data of a set of normal objects among the multiple normal objects from the remote S3-compatible server into the storage device layer of the storage server as respective replacements of a set of index objects among the multiple index objects, for completing the migration of the user data.

In addition to the above method, the present invention also provides a storage server. The storage server may comprise a host device and a storage device layer, where the host device is arranged to control operations of the storage server. For example, the host device may comprise a processing circuit that is arranged to control the host device to perform index-object-based S3 migration management in the storage server. In addition, the storage device layer may comprise at least one storage device that is coupled to the host device, and the aforementioned at least one storage device is arranged to store information for the storage server. For example, in response to a request of migrating user data of a user of the storage server from a remote S3-compatible server into the storage server, during an index stage among multiple stages of the migration of the user data, an index-object-based S3 migration management module among multiple program modules running on the processing circuit creates and stores multiple index objects into the storage device layer to be respective representatives of multiple normal objects of the user data at the storage server, and migrates respective Access Control Lists (ACLs) of the multiple normal objects to the storage server to be respective ACLs of the multiple index objects, for minimizing probability of any change of any normal object of the multiple normal objects affecting correctness of the migration of the user data; and during a data stage after the index stage among the multiple stages, the index-object-based S3 migration management module triggers one or more migration agents to migrate respective object data of a set of normal objects among the multiple normal objects from the remote S3-compatible server into the storage device layer of the storage server as respective replacements of a set of index objects among the multiple index objects, for completing the migration of the user data.

The present invention method and associated apparatus can use index objects to perform S3 seamless migration. After an index stage/phase (e.g. a short time period), the present invention method and associated apparatus can perform seamless migration with minor overhead in a data stage/phase, where the overhead of the data stage/phase is typically less than the overhead of the index stage/phase.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing Simple Storage Service (S3) seamless migration using index objects. For example, the method and the associated apparatus can perform access control with a novel S3 Seamless Migration architecture, and more particularly, can perform S3 seamless migration regarding private clouds, such as S3 seamless migration from any public/private cloud to a private cloud (e.g. a destination cloud of data migration), to allow the user to access data normally and smoothly during data migration. For better comprehension, a first cloud such as S3-compatible storage (e.g. it may be nearly full, and the access speed thereof may be slow) and a second cloud such as Bigtera storage implemented according to the method can be taken as examples of said any public/private cloud and said private cloud (e.g. the destination cloud), respectively, but the present invention is not limited thereto. In addition, when starting migration at a first time point T1, the method and the associated apparatus can first create index objects such as dummy index objects in the second cloud during an index stage such as INDEX stage (e.g. an index phase such as INDEX phase) starting from the first time point T1, and can migrate (e.g. transfer) object data from the first cloud to the second cloud during a data stage such as DATA stage (e.g. a data phase such as DATA phase) starting from a second time point T2 (e.g. a time point when creating the index objects is completed). In some embodiments, the S3 Seamless Migration architecture can utilize one or more migration agents to perform object migration. Additionally, the apparatus may comprise at least one portion (e.g. a portion or all) of a storage server. For example, the apparatus may comprise a portion of the storage server, such as a host device within the storage server or an associated control circuit positioned within the host device (e.g. a processing circuit running one or more program modules corresponding to the method, and associated circuits). In another example, the apparatus may comprise the whole of the storage server. According to some experiments regarding the storage server, the INDEX phase may represent a short time period such as multiple hours or a few days, and the DATA phase may represent a longer time period such as a few weeks.

Figure 1:
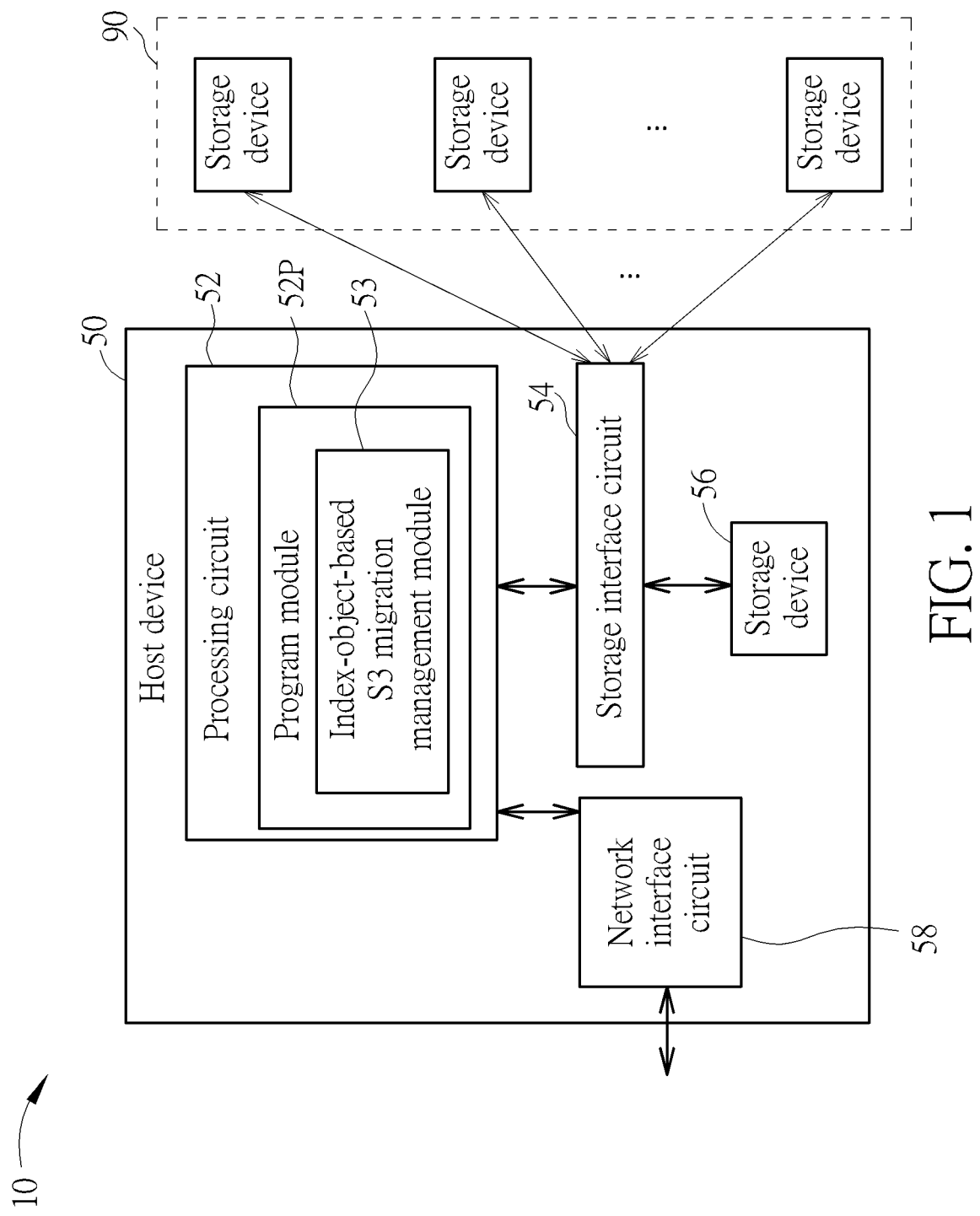
FIG. 1 is a diagram of a storage server according to an embodiment of the present invention.

FIG. 1 is a diagram of a storage server 10 according to an embodiment of the present invention. The storage server 10 comprises a host device 50, and comprises at least one storage device (e.g. one or more storage devices) such as a plurality of storage devices 90. The plurality of storage devices 90 are coupled to the host device 50. According to this embodiment, the host device 50 can be configured to control operations of the storage server 10, and the plurality of storage devices 90 can be configured to store information for the storage server 10. As shown in FIG. 1, the host device 50 may comprise a processing circuit 52 (e.g. at least one processor/processor core and associated circuits such as Random Access Memory (RAM), bus, etc.) for controlling operations of the host device 50, at least one storage interface circuit 54 for coupling the plurality of storage devices 90 and for coupling storage or memory devices (e.g. one or more Hard Disk Drive (HDDs) and/or one or more Solid State Drives (SSDs)) at the host device 50, and a network interface circuit 58 for coupling the host device 50 to at least one network. The storage or memory devices may comprise at least one storage device such as one or more storage devices, which may be collectively referred to as the storage device 56. For example, the storage device 56 may comprise a set of storage devices, where one of them may be utilized as a system disk of the host device 50, and the others can be configured to store user data for the host device 50, but the present invention is not limited thereto. For another example, the storage device 56 may comprise one storage device, and this storage device may be utilized as the system disk of the host device 50.

According to this embodiment, the processing circuit 52 running program modules 52P (more particularly, an index-object-based S3 migration management module 53 corresponding to the method) can be configured to control operations of the host device 50 according to the method, for example, control the host device 50 to perform index-object-based S3 migration management in the storage server 10, and the storage interface circuit 54 may conform to one or more specifications (e.g. one or more of Serial Advanced Technology Attachment (Serial ATA, or SATA) specification, Peripheral Component Interconnect (PCI) specification, Peripheral Component Interconnect Express (PCIe) specification, Non-Volatile Memory Express (NVMe) specification, NVMe-over-Fabrics (NVMeoF) specification, Small Computer System Interface (SCSI) specification, UFS specification, etc.), and can perform communications according to the one or more specifications, to allow the processing circuit 52 running the program modules 52P to access the storage device 56 and the plurality of storage devices 90 through the storage interface circuit 54. In addition, the network interface circuit 58 can be configured to provide wired or wireless network connections, and one or more client devices corresponding to one or more users can access (e.g. read or write) user data in the storage server 10 (e.g. the storage device 56 and the plurality of storage devices 90 therein) through the wired or wireless network connections. For better comprehension, the host device 50 and the associated circuits/modules/devices in the architecture shown in the left-hand side of FIG. 1 (e.g. the processing circuit 52 running the program modules 52P, and the storage interface circuit 54) can be taken as examples of the aforementioned host device and the associated circuits/modules/devices thereof (e.g. the processing circuit running the one or more program modules corresponding to the method, and the associated circuits), respectively.

In the architecture shown in FIG. 1, the storage server 10 can be illustrated to comprise the host device 50 and the plurality of storage devices 90 coupled to the host device 50, but the present invention is not limited thereto. For example, the host device 50 may further comprise a shell/case/casing (e.g. a computer casing, which can be made of metal and/or one or more other materials) for installing the components of the host device 50 such as that shown in FIG. 1 (e.g. the processing circuit 52, the storage interface circuit 54, the network interface circuit 58, etc.) and at least one portion (e.g. a portion or all) of the plurality of storage devices 90. For another example, the storage server 10 may further comprise at least one switch circuit (e.g. one or more switch circuits) coupled between the host device 50 and at least one portion (e.g. a portion or all) of the plurality of storage devices 90, for performing signal switching between the host device 50 and the aforementioned at least one portion of the plurality of storage devices 90.

According to some embodiments, the processing circuit 52 running the program modules 52P or the storage interface circuit 54 can configure at least one portion (e.g. a portion or all) of the plurality of storage devices 90 to form a storage pool architecture, but the present invention is not limited thereto. According to some embodiments, the processing circuit 52 running the program modules 52P or the storage interface circuit 54 can configure at least one portion (e.g. a portion or all) of the plurality of storage devices 90 to form a Redundant Array of Independent Disks (RAID) of the storage server 10, such as an All Flash Array (AFA).

Figure 2:
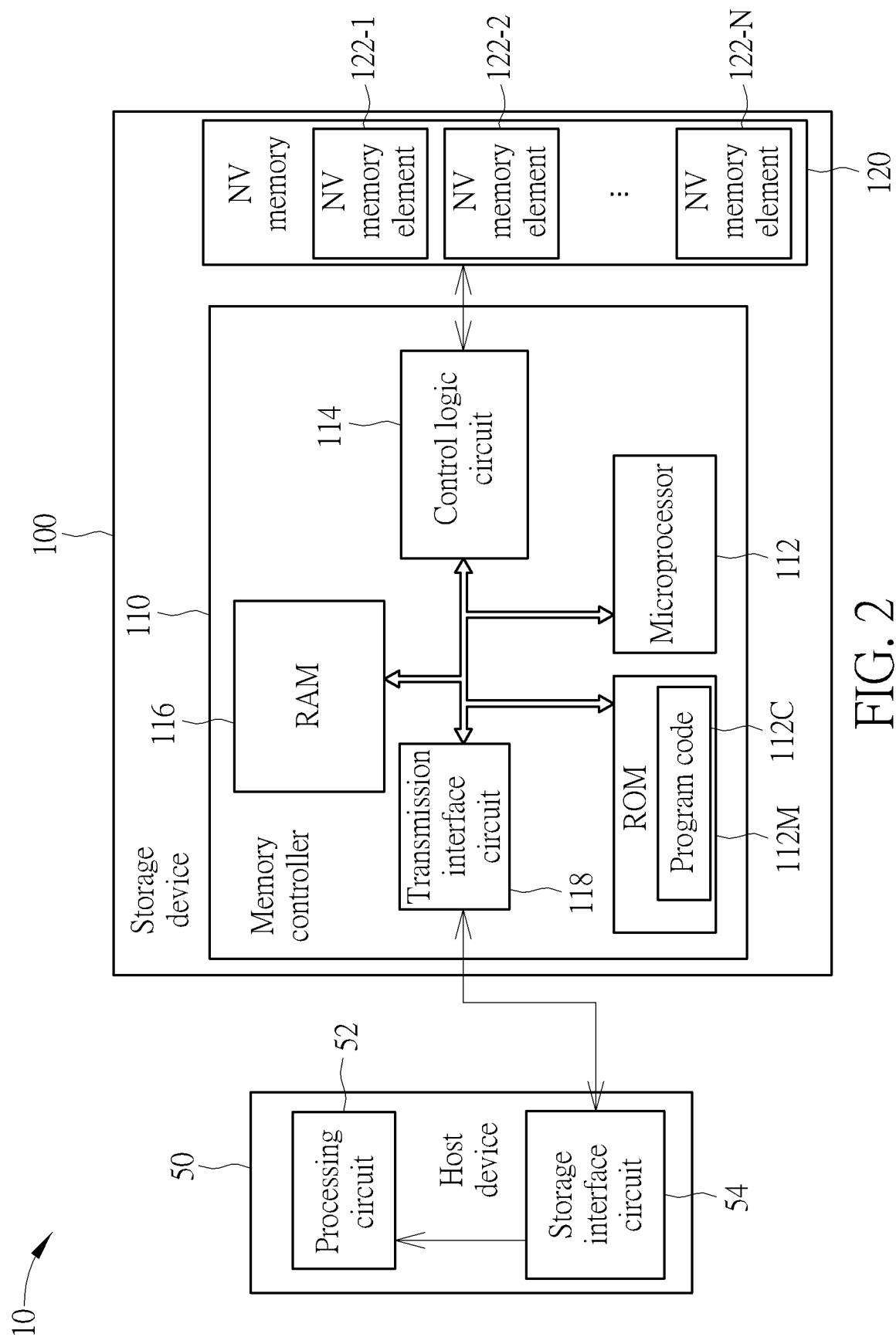
FIG. 2 illustrates some implementation details of a storage device within the storage server shown in FIG. 1 according to an embodiment of the present invention.

FIG. 2 illustrates some implementation details of a storage device within the storage server 10 shown in FIG. 1 according to an embodiment of the present invention, where the storage device 100 can be taken as an example of any of the plurality of storage devices 90. More particularly, each of the plurality of storage devices 90 can be implemented according to the architecture of the storage device 100, but the present invention is not limited thereto. The storage device 100 can be configured to provide the host device 50 with storage space. Under control of the host device 50, the one or more client devices can assess (e.g. read or write) user data in the storage space. Examples of the host device 50 may include, but are not limited to: a personal computer such as a desktop computer and a laptop computer. Examples of the storage device 100 may include, but are not limited to: an SSD, and various types of embedded memory devices such as that conforming to the UFS or EMMC specifications, etc. According to this embodiment, the storage device 100 may comprise a controller such as a memory controller 110, and may further comprise a NV memory 120, where the controller is arranged to control operations of the storage device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

According to this embodiment, the memory controller 110 can be configured to control the accessing of the flash memory 120, to allow the host device 50 to access the NV memory 120 through the memory controller 110, for performing accessing management in the storage server 10. As shown in FIG. 2, the memory controller 110 may comprise a processing circuit such as a microprocessor 112, a storage unit such as a read-only memory (ROM) 112M, a control logic circuit 114, a RAM 116, and a transmission interface circuit 118, where the above components can be coupled to one another via a bus. The RAM 116 is implemented by a Static RAM (SRAM), but the present invention is not limited thereto. The RAM 116 can be configured to provide the memory controller 110 with internal storage space. For example, the RAM 116 can be utilized as a buffer memory for buffering data. In addition, the ROM 112M of this embodiment is arranged to store a program code 112C, and the microprocessor 112 is arranged to execute the program code 112C to control operations of the memory controller 110 for controlling the accessing of the flash memory 120, to allow the host device 50 to access the NV memory 120 through the memory controller 110. Note that, in some examples, the program code 112C can be stored in the RAM 116 or any type of memory. Further, the control logic circuit 114 can be configured to control the flash memory 120, and may comprise a data protection circuit (not shown) for protecting data and/or performing error correction, but the present invention is not limited thereto. The transmission interface circuit 118 may conform to a specific communications specification (e.g. the SATA specification, the PCI specification, the PCIe specification, the NVMe specification, the NVMeoF specification, the SCSI specification, the UFS specification, etc.), and may perform communications according to the specific communications specification, for example, perform communications with the host device 50 for the storage device 100, where the storage interface circuit 54 may conform to the specific communications specification, for performing communications with the storage device 100 for the host device 50.

According to some embodiments, the host device 50 can transmit host commands and corresponding logical addresses to the memory controller 110 to access the storage device 100. The memory controller 110 receives the host commands and the logical addresses, and translates the host commands into memory operating commands (which may be simply referred to as operating commands), and further controls the NV memory 120 with the operating commands to perform reading, writing/programming, etc. on memory units (e.g. data pages) having physical addresses within the flash memory 120, where the physical addresses can be associated with the logical addresses. When the memory controller 110 perform an erase operation on any NV memory element 122-n of the plurality of NV memory elements 122-1, 122-2, . . . , and 122-N (in which "n" may represent any integer in the interval [1, N]), at least one block of multiple blocks of the NV memory element 122-n may be erased, where each block of the blocks may comprise multiple pages (e.g. data pages), and an access operation (e.g. reading or writing) may be performed on one or more pages.

According to some embodiments, the storage server 10 (e.g. the host device 50) can operate according to a Ceph solution, to make the storage server 10 become a portion of a distributed storage system through software definition. Preferably, a plurality of storage systems (e.g. multiple storage servers {10} such as the storage server 10) can be configured to form a resource pool of the distributed storage system, for supporting various types of accessing, such as a block device type (e.g. for accessing an emulated block device within the distributed storage system), a file system type (e.g. for accessing a file system within the distributed storage system), and an object type (e.g. for accessing an object in object namespace within the distributed storage system), for example, with certain features such as fault tolerance, automatic failover control, etc., but the present invention is not limited thereto. For example, a file can be stored as an object in the object namespace within the distributed storage system. For another example, a data block corresponding to a certain address can be stored as an object in the object namespace within the distributed storage system. For carrying out the features of the distributed storage system, in addition to data (e.g. user data), the storage server 10 can be configured to store additional information such as metadata and journal.

Figure 3:
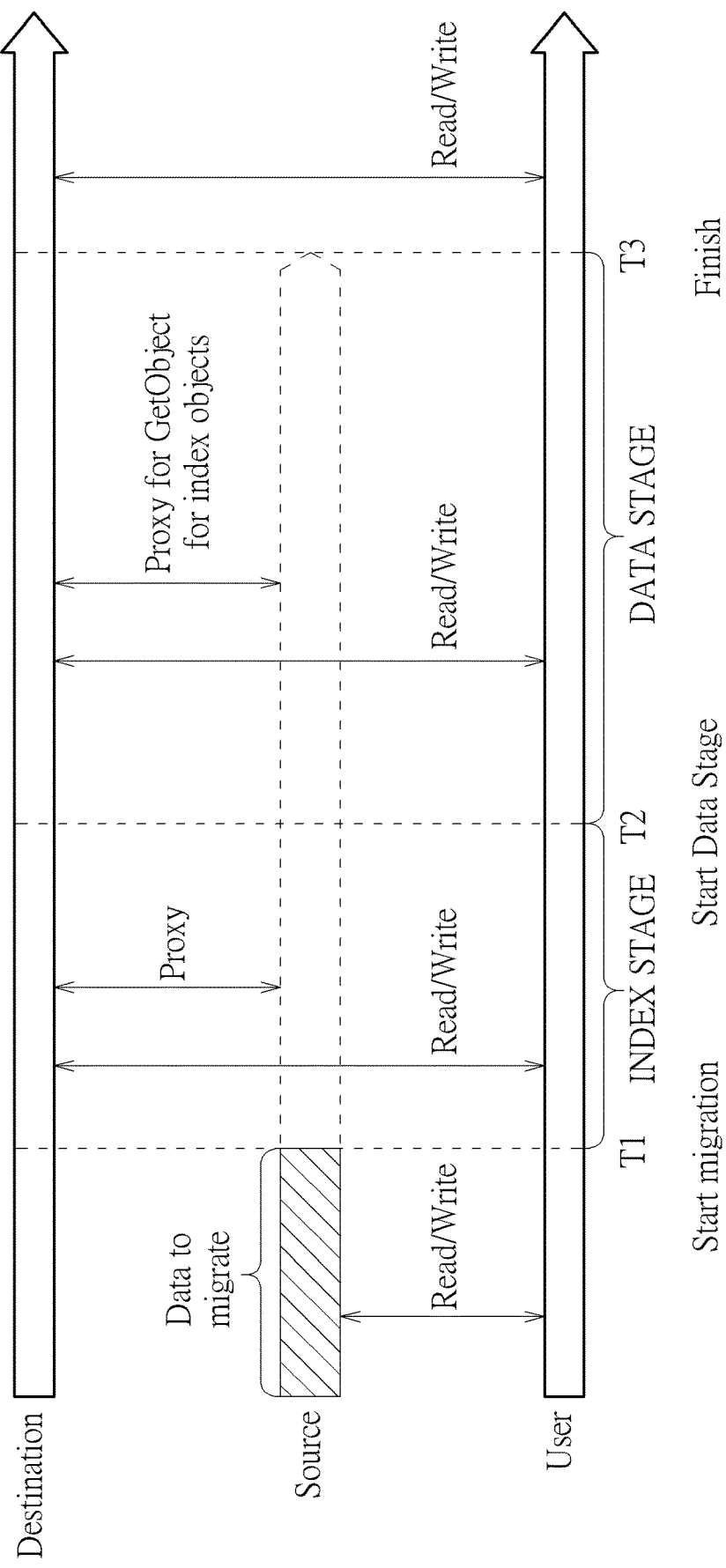
FIG. 3 is an index-object-based migration control scheme of a method for performing S3 seamless migration using index objects according to an embodiment of the present invention.

FIG. 3 is an index-object-based migration control scheme of the method for performing S3 seamless migration using index objects according to an embodiment of the present invention, where the method can be applied to the storage server 10. The storage server 10 can play the role of the second cloud and can be regarded as the destination of the data migration, and a remote S3-compatible server can play the role of the first cloud and can be regarded as the source of the data migration. For example, before the first time point T1, the user may access (e.g. read or write) data in the remote S3-compatible server and find that his/her personal storage capacity in the remote S3-compatible server is almost used up, and may suffer from poor performance of the remote S3-compatible server.

In response to a request of migrating user data of the user of the storage server 10 from the remote S3-compatible server into the storage server 10, during the index stage (e.g. INDEX stage) among multiple stages of the migration of the user data (e.g. migrating the user data from the remote S3-compatible server into the storage server 10, as requested by the user), the index-object-based S3 migration management module 53 among the program modules 52P running on the processing circuit 52 can create and store multiple index objects (e.g. dummy objects having no object data) into a storage device layer of the storage server 10 to be respective representatives of multiple normal objects of the user data at the storage server 10, and migrate respective Access Control Lists (ACLs) of the multiple normal objects to the storage server 10 to be respective ACLs of the multiple index objects, as if the multiple index objects are the multiple normal objects, for minimizing probability of any change of any normal object of the multiple normal objects affecting correctness of the migration of the user data, where the storage device layer comprises at least one storage device (e.g. one or more storage devices) that is coupled to the host device 50, such as the plurality of storage devices 90. By migrating the respective ACLs of the multiple normal objects to the storage server 10 to be the respective ACLs of the multiple index objects, the index-object-based S3 migration management module 53 can emulate the multiple normal objects with the multiple index objects. For example, the destination such as the storage server 10 can start the migration at the first time point T1. After the first time point T1, when the user sends any other request to the destination such as the storage server 10 to try making the any change of the any normal object, the storage server 10 can selectively proxy (e.g. forward) the any other request to the source such as the remote S3-compatible server and proxy (e.g. forward) a response corresponding to the any other request from the source to the user, depending on whether one or more predetermined conditions are satisfied (e.g. whether the any other request conformed to one or more predetermined rules).

During the data stage (e.g. DATA stage) after the index stage among the multiple stages, the index-object-based S3 migration management module 53 can trigger one or more other program modules such as one or more migration agents to migrate respective object data of a set of normal objects among the multiple normal objects from the remote S3-compatible server into the storage device layer of the storage server 10 as respective replacements of a set of index objects among the multiple index objects, for completing the migration of the user data. For example, the destination such as the storage server 10 can start the data stage at the second time point T2, and finish the migration at the time point T3. Assume that, during the data stage, the user sends the any other request to the destination such as the storage server 10 to try making the any change of the any normal object. Similarly, the storage server 10 can selectively proxy (e.g. forward) the any other request to the source such as the remote S3-compatible server and proxy (e.g. forward) the response corresponding to the any other request from the source to the user, depending on whether one or more predetermined conditions are satisfied (e.g. whether the any other request conformed to one or more predetermined rules). For example, when the any other request is a Get-Object request (e.g. "GetObject"), the storage server 10 can proxy (e.g. forward) for this request between the user and the source, and more particularly, proxy (e.g. forward) this request for some index whose respective object data objects has not been migrated into the destination (e.g. during the migration, at the moment when the storage server 10 receives the Get-Object request, respective object data of these index objects has not been copied to the destination and needs to be copied to the destination). For better comprehension, in a situation where the any other request does not exist (e.g. the user does not send the any other request during the period between the time points T1 and T3), the set of normal objects may comprise all of the multiple normal objects and the set of index objects may comprise all of the multiple index objects.

As long as implementation of the present invention will not be hindered, the one or more migration agents can be implemented by way of one or more program modules of the following program modules:
(1) one or more other program modules among the program modules 52P running on the processing circuit 52;
(2) for the case of multi-node architecture having multiple processing circuits {52} in the host device 50, one or more program modules running on one or more other processing circuits among the multiple processing circuits {52}, where the multiple processing circuits {52} comprises the processing circuit 52; and
(3) for the case of multi-host architecture having multiple host devices {50} in the storage server 10, one or more program modules running on one or more corresponding processing circuits of one or more other host devices among the multiple host devices {50}, where the multiple host devices {50} comprises the host devices 50);
but the present invention is not limited thereto.

According to some embodiments, the method and the associated apparatus can be configured to utilize Ceph's software libraries (e.g. "librados" software libraries) to perform some basic operations regarding Ceph architecture, where the Ceph's software libraries can be configured to provide client applications with direct access to the Reliable Autonomic Distributed Object Store (RADOS) object-based storage system, and also provide a foundation for some of Ceph's features such as RADOS Block Device (RBD), RADOS Gateway (RGW), the Ceph File System, etc., and RADOS can be a part of a Ceph distributed storage system, and can be regarded as a utility for interacting with a Ceph object storage cluster, but the present invention is not limited thereto.

Figure 4:
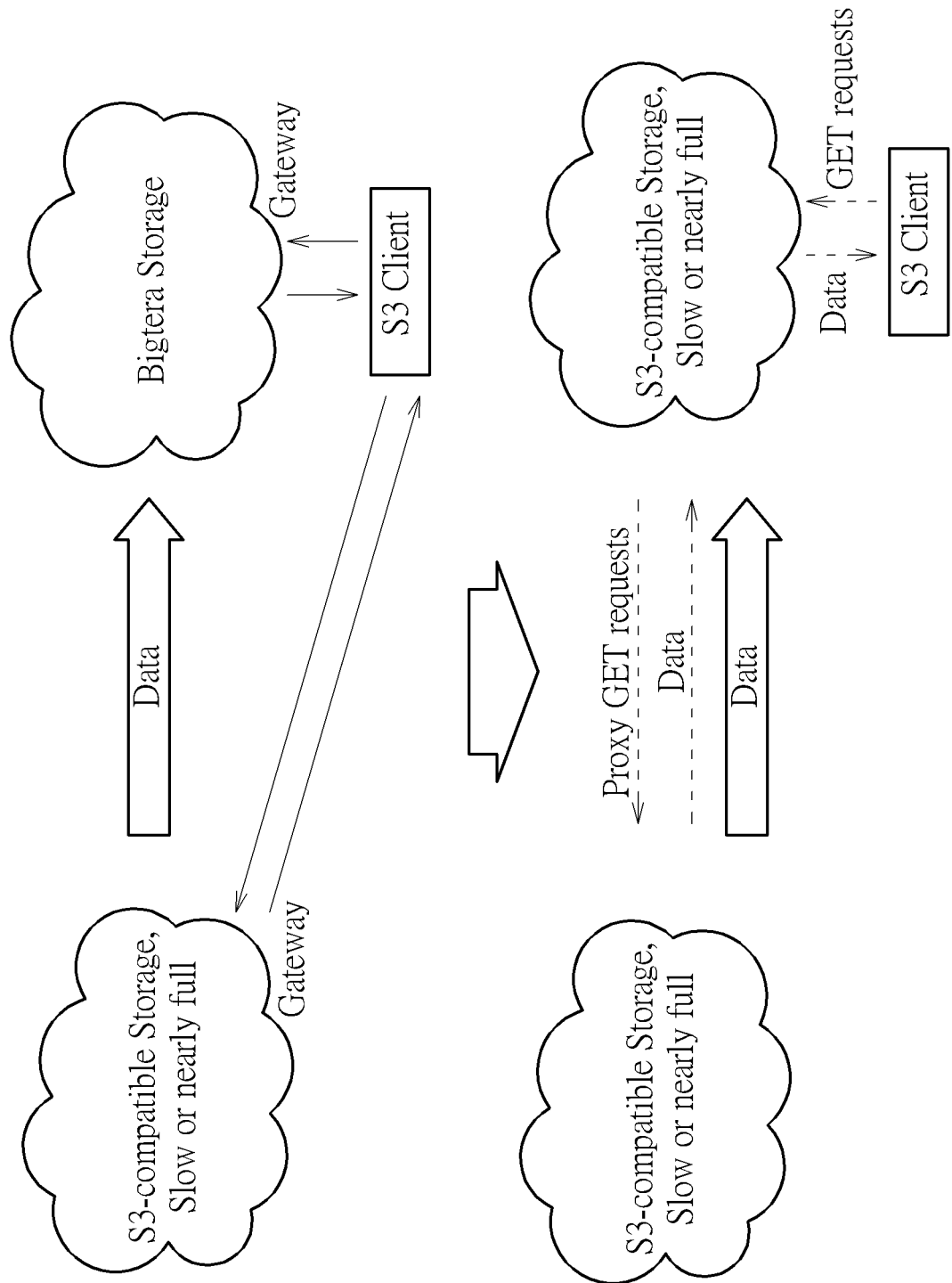
FIG. 4 illustrates some associated operations of the index-object-based migration control scheme shown in FIG. 3 according to an embodiment of the present invention.

FIG. 4 illustrates some associated operations of the index-object-based migration control scheme shown in FIG. 3 according to an embodiment of the present invention. The first cloud and the second cloud (respectively labeled "S3-compatible Storage" and "Bigtera Storage" for better comprehension) can be taken as examples of the remote S3-compatible server and the storage server 10, respectively. The user can access the remote S3-compatible server and the storage server 10 through a client device such as the S3 client, respectively. For example, each of the remote S3-compatible server and the storage server 10 can provide Simple Storage Service (S3) and can be S3-compatible, and more particularly, can provide object storage, for handling large amounts of unstructured data, and can be accessed by using Hypertext Transfer Protocol (HTTP)/Hypertext Transfer Protocol Secure (HTTPS) through Representational State Transfer (REST)-based Application Program Interfaces (APIs) (e.g. web service APIs that adhere to REST architectural constraints) such as RESTful APIs. Regarding some S3-features, each of the remote S3-compatible server and the storage server 10 can be configured to store one or more objects in a bucket (e.g. a container for objects), and any object of the one or more objects may consist of a file and optionally any metadata that describes this file, where an object prefix of the any object may comprise one or more of the symbol "/" to support a folder concept, for emulating a folder. In addition, each of the remote S3-compatible server and the storage server 10 can be equipped with at least one Ceph Object Gateway (labeled "Gateway" for brevity) such as at least one object storage interface built on top of librados to provide applications with a RESTful gateway to Ceph Storage Clusters, where the at least one Ceph Object Gateway supports the remote S3-compatible server and the storage server 10 to be S3-compatible and Swift-compatible. As shown in the upper half of FIG. 4, the user may need to migrating the user data (labeled "Data" for brevity) since the remote S3-compatible server becomes slow or nearly full. As shown in the lower half of FIG. 4, during the migration of the user data (labeled "Data" in the hollow arrow for brevity), the user may send (by using the S3 client) the any other request such as GET requests to the storage server 10 to ask for partial data of the user data. The storage server 10 can proxy (e.g. forward) the any other request such as the GET requests to the remote S3-compatible server, and proxy (e.g. forward) the response corresponding to the any other request, such as the partial data (labeled "Data" at some arrows depicted with dashed lines for brevity), from the remote S3-compatible server to the user (e.g. the S3 client of the user). For brevity, similar descriptions for this embodiment are not repeated in detail here.

According to some embodiments, in the INDEX stage (e.g. the INDEX phase), each index object of the multiple index objects may be created to have some attributes of a source (src) object (e.g. a corresponding object in the first cloud, such as a normal object, where this index object is playing the role of the representative of the normal object)

by default, and these attributes may comprise the last-modified-time (mtime) of the source object (e.g. src-mtime such as bigtera-src-mtime), the size of the source object (e.g. src-size such as bigtera-src-size), and the entity tag (Etag) (e.g. a file hash for integrity check, such as MD5 sum) of the source object (e.g. src-etag such as bigtera-src-etag).

Figure 5:
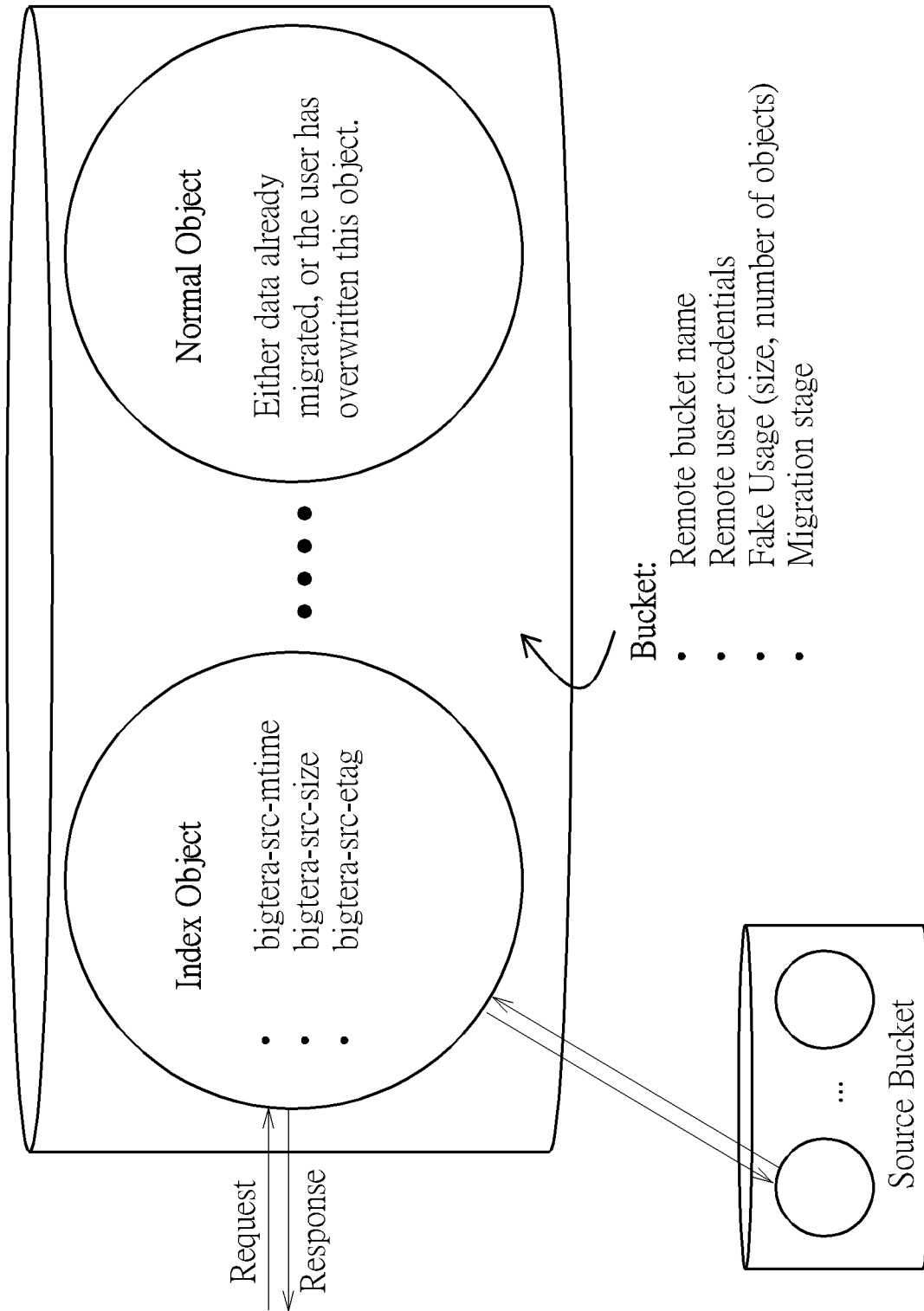
FIG. 5 illustrates some objects related to the index-object-based migration control scheme shown in FIG. 3 and some associated features according to an embodiment of the present invention.

FIG. 5 illustrates some objects related to the index-object-based migration control scheme shown in FIG. 3 and some associated features according to an embodiment of the present invention. During the migration of the user data, the source such as the remote S3-compatible server may comprise one or more buckets (e.g. one or more containers for objects) such as the remote bucket, and the destination such as the storage server 10 may comprise one or more buckets (e.g. one or more containers for objects) such as the bucket illustrated above the remote bucket, where the request and the response represent the request received from the user (e.g. the S3 client of the user) by the storage server 10 and the response returned to the user (e.g. the S3 client of the user) by the storage server 10, respectively. For example, the remote bucket may comprise the multiple normal objects, as illustrated with the small circles in the remote bucket for better comprehension, and the bucket of the destination may comprise at least one portion (e.g. a portion or all) of the multiple index objects, and more particularly, one or more normal objects, depending on the progress of the migration (e.g. a percentage of completion of the migration, such as 1%, 2%, etc.) and/or existence of the any other request.

Before migrating object data of any index object of the aforementioned at least one portion of the multiple index objects, the storage server 10 can set the bucket of the destination to have the same bucket name as the remote bucket name (e.g. the bucket name of the remote bucket) and have the same user credentials as the remote user credentials (e.g. the user credentials of the remote bucket), and more particularly, have fake usage information such as information of fake usage (e.g. size, number of objects, etc.), to be temporary usage information of the migration stage (e.g. the index stage and the data stage). In the beginning, before migrating the object data of the any index object, the storage server 10 can create the multiple index objects such as dummy index objects (e.g. dummy objects having no object data) first with temporary attributes in the bucket of the destination. When a normal object among the multiple normal objects has been migrated into the destination or a certain operation regarding this normal object has been performed on the destination (e.g. either object data of this normal object is already migrated, or the user has overwritten this normal object), the normal object may exist in this bucket as shown in FIG. 5. In addition, for each index object of the multiple index objects, the temporary attributes may comprise:

(1) source object last-modified-time (e.g. the last-modified-time of the source object) such as bigtera-src-mtime;
(2) source object size (e.g. the size of the source) such as bigtera-src-size;
(3) source object Etag (e.g. the Etag of the source object) such as bigtera-src-etag; where any attribute (e.g. each attribute) of the temporary attributes may be implemented as an extended attribute (x-attribute/XATTR/xattr), but the present invention is not limited thereto. Once the object data of the source object is migrated into the destination or the user overwrites the object data at the destination, the destination such as the storage server 10 can remove the temporary attributes listed above. For brevity, similar descriptions for this embodiment are not repeated in detail here.

According to some embodiments, taking the normal object shown in the upper right of FIG. 5 as an example of the source object, when the object data of the source object is migrated into the destination or the user overwrites the object data at the destination, the storage server 10 can invalidate the index object playing the role of the representative of the normal object (e.g. by removing the temporary attributes thereof) and/or replace the index object with the normal object in the bucket of the destination, but the present invention is not limited thereto.

Typically, changing an Access Control List (ACL) of an object does not change a modified time of this object. The data migration method of the related art seems to be proposed without considering this, and therefore cannot properly deal with deleted objects, read-only objects, etc. The present invention method and associated apparatus can operate properly in any of various situations, where further implementation details will be described in the following embodiments.

Figure 6:
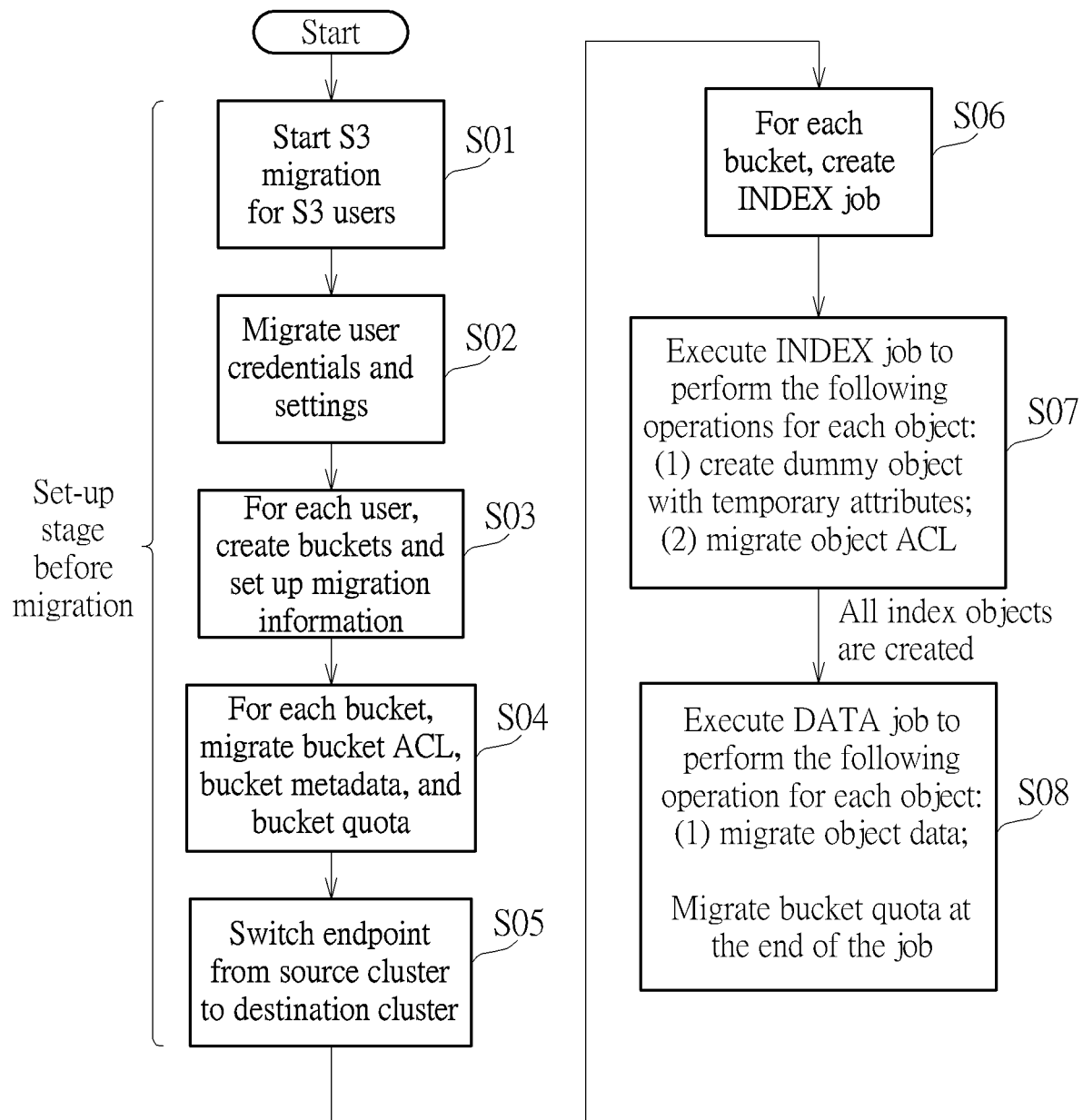
FIG. 6 illustrates a migration agent control scheme of the method for performing S3 seamless migration using index objects according to an embodiment of the present invention.

FIG. 6 illustrates a migration agent control scheme of the method for performing S3 seamless migration using index objects according to an embodiment of the present invention. In response to the request of migrating the user data from the remote S3-compatible server into the storage server 10, during a set-up stage (e.g. a set-up phase) before the index stage among the multiple stages, the storage server 10 can utilize the index-object-based S3 migration management module 53 to perform pre-processing of the migration of the user data. For example, the pre-processing may comprise operations of Steps S01-S05, but the present invention is not limited thereto.

In Step S01 the index-object-based S3 migration management module 53 can start S3 migration for a set of S3 users (e.g. a single user such as the user mentioned above, or multiple users comprising the user mentioned above), for example, upon trigger of the request.

In Step S02, the index-object-based S3 migration management module 53 can migrate respective user credentials and respective settings (e.g. quota) of the set of S3 users.

In Step S03, the index-object-based S3 migration management module 53 can, for each user of the set of users, create one or more buckets thereof at the destination and set up associated migration information. For example, the migration information may comprise proxy parameters, such as remote user credentials for proxying (e.g. forwarding) and other proxy parameters, for guiding the destination such as the storage server 10 to proxy (e.g. forward) the any other request to the source such as the remote S3-compatible server and proxy (e.g. forward) the response corresponding to the any other request from the source to the user.

In Step S04, the index-object-based S3 migration management module 53 can, for each bucket of the one or more buckets, migrate bucket ACL, bucket metadata, and bucket quota of a corresponding remote bucket of the source to be that of this bucket of the one or more bucket.

In Step S05, the index-object-based S3 migration management module 53 can switch at least one endpoint for accessing the user data from at least one cluster of the remote S3-compatible server to at least one cluster of the storage server 10.

In Step S06, after the set-up stage, the index-object-based S3 migration management module 53 can, for said each bucket of the one or more buckets, create an index bucket job such as INDEX job, for performing the migration from the corresponding remote bucket of the source to this bucket of the one or more bucket. For example, the index-objectbased S3 migration management module 53 can set this bucket to the index stage such as the INDEX stage.

For better comprehension, any migration agent (e.g. each migration agent) of the one or more migration agents can be regarded as the program module that actually performs object migration. For example, the index-object-based S3 migration management module 53 can create multiple types of jobs, such as multiple index jobs (e.g. multiple INDEX jobs) corresponding to the index stage and multiple data jobs (e.g. multiple DATA jobs) corresponding to the data stage, and more particularly, deliver and/or distribute the multiple types of jobs to the one or more migration agents, to perform operations of the index stage and the data stage, respectively. Assume that the one or more migration agents comprise multiple migration agents. The multiple migration agents can be implemented to run on multiple cluster nodes, respectively, with one migration agent running on each cluster node of the multiple cluster nodes. As a result, the index-object-based S3 migration management module 53 can migrate the user data (e.g. respective object data of the objects) from the source to the destination in parallel with aid of the one or more migration agents such as the multiple migration agents.

In Step S07, the index-object-based S3 migration management module 53 can execute the INDEX job with a certain migration agent of the one or more migration agents, to perform the following operations for each object (e.g. each normal object of the multiple normal objects) of the source:

(1) create a dummy object (e.g. an object having no object data) with temporary attributes (e.g. the source object last-modified-time such as bigtera-src-mtime, the source object size such as bigtera-src-size, and the source object Etag such as bigtera-src-etag) to be one of the multiple index objects, where the temporary attributes can be fake attributes (e.g. fake last-modified-time, fake Etag such as fake file-hash, and fake size) of said each object of the source, rather than real attributes of said each object of the source, and therefore can be regarded as special attributes;

(2) migrate object ACL of this object from the source to the destination;

where all index objects of the multiple index objects are created after all operations of Step S07 are completed.

When the index jobs such as the INDEX jobs is done, the index-object-based S3 migration management module 53 can, for said each bucket of the one or more buckets, create a data job such as DATA job, for performing the migration from the corresponding remote bucket of the source to this bucket of the one or more bucket.

In Step S08, regarding said each bucket of the one or more buckets, the index-object-based S3 migration management module 53 can execute the DATA job with a certain migration agent of the one or more migration agents, to perform the following operation for each object (e.g. each normal object of the multiple normal objects, in case of the non-existence of the any other request; or each normal object of the set of normal objects, in case of the existence of the any other request, where the any other request may cause overwriting a certain object at the destination to be a normal object in this bucket) of the source:

(1) migrate object data of this object from the source to the destination;

where this migration agent can migrate a latest version of the bucket quota (e.g. the original bucket quota of the corresponding remote bucket, in case of the non-existence of the any other request; or a bucket quota updated in response to the any change made by the user, in case of the existence of the any other request) to be the bucket quota of this bucket at the end of the job. For example, the index-object-based S3 migration management module 53 can set this bucket to the data stage such as the DATA stage.

Among all buckets corresponding to the set of S3 users, when a bucket of these buckets is under processing in the index stage such as the INDEX stage, another bucket of these buckets may be under processing in the data stage such as the DATA stage. Assume that the one or more buckets comprise multiple buckets. When a bucket of the multiple buckets is under processing in the index stage such as the INDEX stage, another bucket of the multiple buckets may be under processing in the data stage such as the DATA stage. For brevity, similar descriptions for this embodiment are not repeated in detail here.

According to some embodiments, the index stage such as the INDEX stage can be much shorter than the data stage such as the DATA stage. In the index stage, the index-object-based S3 migration management module 53 can execute the INDEX job with the migration agent in Step S07, to list remote objects such as the multiple normal objects of the source first, for performing the operations of creating the dummy object and migrating the object ACL. As the any other request may exist in the index stage such as the INDEX stage, different cases such as a first case that the index object is not yet created, a second case that the storage server 10 is creating the index object, etc. should considered. For example, processing regarding PUT/POST requests should be done at the local site (e.g. the destination such as the storage server 10), and the storage server 10 can perform the processing regarding the PUT/POST requests and proxy the PUT/POST requests to the remote site (e.g. the source such as the remote S3-compatible server) at the same time, to make the bucket usage and result of a List-Objects request (e.g. ListObjects request) correct. In a situation where the any other request exists in the index stage such as the INDEX stage, the user can overwrite one or more objects in this stage. If an index object is overwritten by the user, this object is no longer an index object, so the migration agent will not migrate object data for it at the data stage such as the DATA stage. In addition, before the data stage such as the DATA stage, all index objects may have already been created (including object ACLs thereof). In the data stage such as the DATA stage, the index-object-based S3 migration management module 53 can execute the DATA job with the migration agent in Step S08, to list local objects (e.g. the objects of the local site) such as the index objects, and migrate object data for each of them. Typically, most operations can be performed normally, except GET/HEAD object requests. In order to resolve the racing hazard, the storage server 10 can use atomic operations for creating the index objects and migrating data associated with the index objects (e.g. the object data of the multiple normal object of the source). For example, when the migration agent is creating the index objects or migrating the data associated with the index objects, the PUT operation is cancelled if a target object of this PUT operation already exists and does not have the aforementioned temporary attributes, which means the user has overwritten this object. Regarding proxying (e.g. forwarding) for index objects in RGW, in a situation where the any other request exists, when the client device such as the S3 client operates on an index object or the bucket of the destination is currently in the INDEX stage, it may be needed that the destination such as the storage server 10 can proxy the any other request to the remote site (e.g. the source such as the remote S3-compatible server), and return the proxy response (e.g. the response corresponding to the any other request) to the client device. For brevity, similar descriptions for these embodiments are not repeated in detail here.

Figure 7:
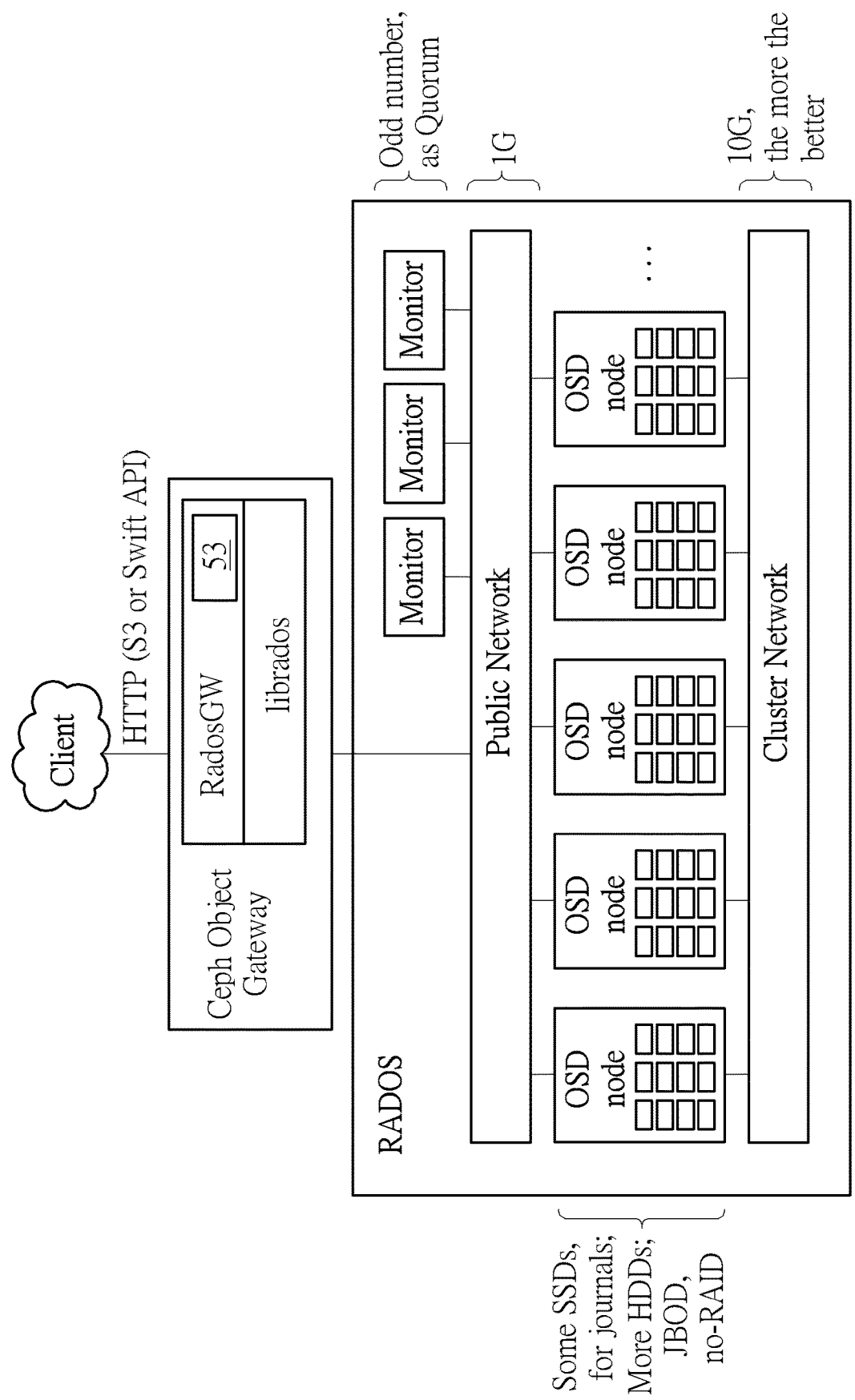
FIG. 7 illustrates an example of a Ceph object storage architecture equipped with the index-object-based S3 migration management module shown in FIG. 1.

FIG. 7 illustrates an example of a Ceph object storage architecture equipped with the index-object-based S3 migration management module 53 shown in FIG. 1. The program modules 52P running on the processing circuit 52 shown in FIG. 1 may comprise a Ceph Object Gateway module (labeled "Ceph Object Gateway" in FIG. 7 for brevity), where the Ceph Object Gateway module comprises some sub-modules such as a RADOS Gateway (RGW) module (labeled "RadosGW" for better comprehension) and the librados software libraries (labeled "librados" for brevity), and the index-object-based S3 migration management module 53 is implemented in the RGW module. According to this embodiment, the client device (labeled "Client") can access the storage server 10 through HTTP (e.g. S3 or Swift API). The storage server 10 can be implemented by way of the multi-node architecture, the multi-host architecture, etc., but the present invention is not limited thereto.

As shown in FIG. 7, a RADOS (e.g. RADOS object-based storage system) of the storage server 10 may comprise multiple Object Storage Device (OSD) nodes coupled to the host device 50 shown in FIG. 1 through at least one public network (e.g. one or more public networks), and further comprise other partial architectures of the Ceph object storage architecture, such as at least one cluster network (e.g. one or more cluster networks) coupled to the multiple OSD nodes, an odd number of Monitors acting as a Quorum, etc. The at least one public network can be configured to reach a first predetermined speed such as 1 Gigabit per second (labeled "1G" for brevity), and the at least one cluster network can be configured to reach a second predetermined speed such as 10 Gigabits per second (labeled "10G" for brevity), the more the better. The multiple OSD nodes may comprise some SSDs for journals (e.g. various types of journals, such as OSD journals, etc.) and more HDDs, and more particularly, comprise non-RAID drive architecture such as Just a Bunch Of Disks/Drives (JBOD). For brevity, similar descriptions for this embodiment are not repeated in detail here.

Regarding S3 RESTful APIs/Operations, examples of object-related operations of S3 actions may include, but are not limited to:
(1) List-Objects request (e.g. ListObjects request);
(2) Head-Object request (e.g. HeadObject request, for getting object attributes);
(3) Get-Object request (e.g. GetObject request);
(4) Get-Object-ACL request (e.g. GetObjectACL request);
(5) Put-Object request (e.g. PutObject request);
(6) Create-Multipart-Upload request (e.g. CreateMultipartUpload request);
(7) Complete-Multipart-Upload request (e.g. CompleteMultipartUpload request);
(8) Put-Object-ACL request (e.g. PutObjectACL request);
(9) Delete-Object request (e.g. DeleteObject request);
where some subsequent embodiments may focus on the object-related operations listed above.

Figure 8:
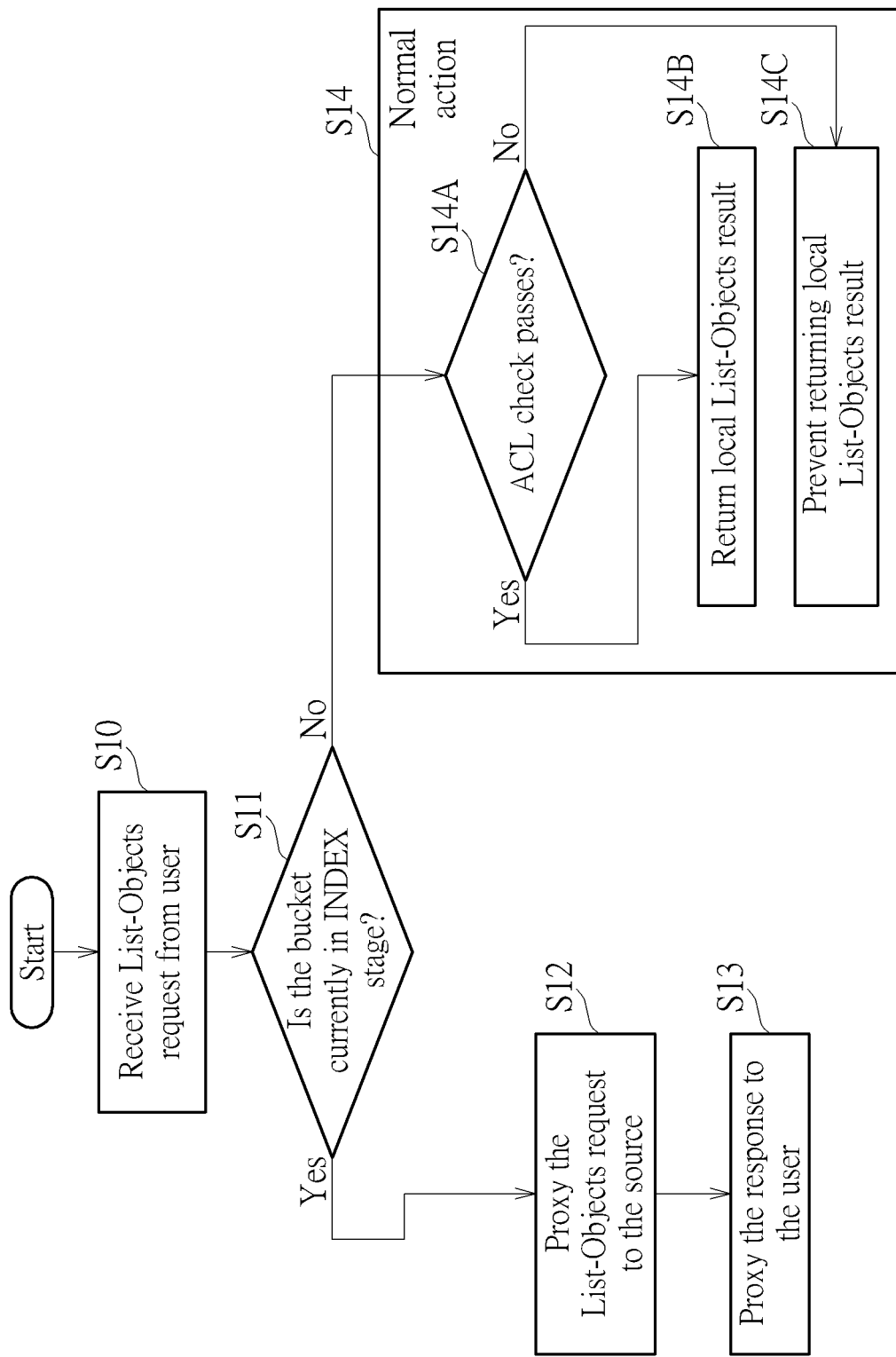
FIG. 8 illustrates a List-Objects control scheme of the method for performing S3 seamless migration using index objects according to an embodiment of the present invention.

FIG. 8 illustrates a List-Objects control scheme of the method for performing S3 seamless migration using index objects according to an embodiment of the present invention. As shown in FIG. 8, a working flow for handling one or more List-Objects requests during the migration of the user data may comprise Steps S10-S14, where Step S14 may comprise some sub-steps such as Steps S14A-S14C.

In Step S10, the storage server 10 (e.g. the index-object-based S3 migration management module 53) can receive a List-Objects request among the one or more List-Objects requests from the user.

In Step S11, in response to the List-Objects request, the index-object-based S3 migration management module 53 can check whether a bucket corresponding to the List-Objects request among at least one bucket in the storage device layer of the storage server 10, such as the bucket of the destination, is currently handled in the index stage such as the INDEX stage, where the at least one bucket may represent at least one container (e.g. one or more containers) for objects. If Yes, Step S12 is entered; if No, Step S14 (e.g. Step S14A) is entered. For example, the List-Objects request is asking for listing objects of the bucket.

In Step S12, in response to the bucket being currently handled in the index stage (e.g. INDEX stage), the index-object-based S3 migration management module 53 can control the storage server 10 to proxy (e.g. forward) the List-Objects request to the source such as the remote S3-compatible server.

In Step S13, the index-object-based S3 migration management module 53 can control the storage server 10 to proxy (e.g. forward) the response corresponding to the List-Objects request from the source such as the remote S3-compatible server to the user.

In Step S14, in response to the bucket being not currently handled in the index stage (e.g. INDEX stage), the index-object-based S3 migration management module 53 can control the storage server 10 to perform at least one normal action according to the List-Objects request, having no need to proxy (e.g. forward) the List-Objects request to the source such as the remote S3-compatible server. For example, the index-object-based S3 migration management module 53 can control the storage server 10 to selectively return a local List-Objects result (e.g. a List-Objects result of the local site, such as the result of executing the List-Objects request at the local site) to the user according to whether an associated ACL check passes.

In Step S14A, the index-object-based S3 migration management module 53 can check whether the ACL check passes. If Yes, Step S14B is entered; if No, Step S14C is entered. For example, when the ACL indicates that the user has the authority of applying the List-Objects request to the bucket (e.g. the authority of obtaining the result of executing the List-Objects request), the index-object-based S3 migration management module 53 can determine that the ACL check passes. For another example, when the ACL indicates that the user does not have the authority of applying the List-Objects request to the bucket (e.g. the authority of obtaining the result of executing the List-Objects request), the index-object-based S3 migration management module 53 can determine that the ACL check fails.

In Step S14B, the index-object-based S3 migration management module 53 can control the storage server 10 to return the local List-Objects result to the user.

In Step S14C, the index-object-based S3 migration management module 53 can control the storage server 10 to prevent from returning the local List-Objects result to the user.

For better comprehension, the method may be illustrated with the working flow shown in FIG. 8, but the present invention is not limited thereto. According to some embodiments, one or more steps may be added, deleted, or changed in the working flow shown in FIG. 8. For example, at least one portion (e.g. a portion or all) of this working flow may be executed multiple times, more particularly, any step comprising a checking operation may be executed multiple times to generate multiple checking results, respectively, to trigger execution of some subsequent steps, respectively.

Figure 9:
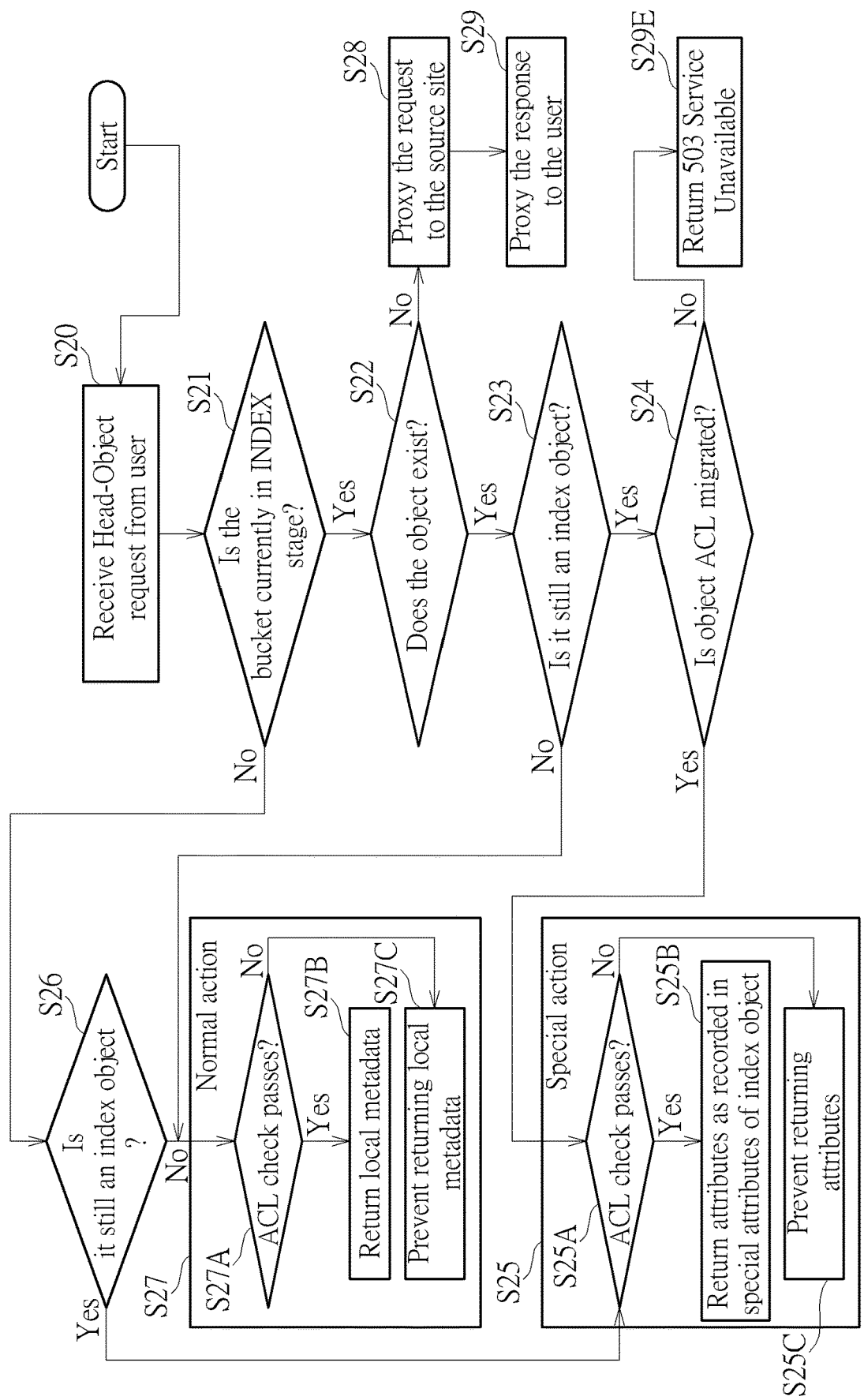
FIG. 9 illustrates a Head-Object control scheme of the method for performing S3 seamless migration using index objects according to an embodiment of the present invention.

FIG. 9 illustrates a Head-Object control scheme of the method for performing S3 seamless migration using index objects according to an embodiment of the present invention. As shown in FIG. 9, a working flow for handling one or more Head-Object requests during the migration of the user data may comprise Steps S20-S28, S29A and S29B, where Step S25 may comprise some sub-steps such as Steps S25A-S25C, and Step S27 may comprise some sub-steps such as Steps S27A-S27C.

In Step S20, the storage server 10 (e.g. the index-object-based S3 migration management module 53) can receive a Head-Object request among the one or more Head-Object requests from the user. For example, the Head-Object request is asking for getting object attributes of an object in the bucket of the destination, and this object can be regarded as a target object of the Head-Object request. The object attributes may comprise:

(1) object last-modified-time (mtime) such as last modified time of the object;
(2) object Etag such as Etag (e.g. file hash) of the object;
(3) object size such as size of the object;

where these attributes can be retrieved by a single HTTP HEAD request.

In Step S21, in response to the Head-Object request, the index-object-based S3 migration management module 53 can check whether a bucket corresponding to the Head-Object request among the aforementioned at least one bucket in the storage device layer of the storage server 10, such as the bucket of the destination, is currently handled in the index stage such as the INDEX stage. If Yes, Step S22 is entered; if No, Step S26 is entered.

In Step S22, in response to the bucket being currently handled in the index stage (e.g. INDEX stage), the index-object-based S3 migration management module 53 can check whether the object (e.g. the target object of the Head-Object request) exists. If Yes, Step S23 is entered; if No, Step S28 is entered.

In Step S23, in response to the existence of the object, the index-object-based S3 migration management module 53 can check whether the object (e.g. the target object of the Head-Object request) is still an index object. If Yes, Step S24 is entered; if No, Step S27 (e.g. Step S27A) is entered.

In Step S24, in response to the object being still an index object, the index-object-based S3 migration management module 53 can check whether the object ACL of the object is migrated. If Yes, Step S25 (e.g. Step S25A) is entered; if No, Step S29A is entered. For example, there is typically a short time lag between creating a dummy object such as that mentioned above and migrating the object ACL, so the index-object-based S3 migration management module 53 can perform the checking operation of Step S24 in this working flow to honor the access control policy.

In Step S25, the index-object-based S3 migration management module 53 can control the storage server 10 to perform at least one special action according to the Head-Object request. For example, the index-object-based S3 migration management module 53 can control the storage server 10 to selectively return attributes as recorded in the special attributes (e.g. src-mtime such as bigtera-src-mtime, src-etag such as bigtera-src-etag, and src-size such as bigtera-src-size) of the index object (e.g. the index object mentioned in Step S23) to the user according to whether an associated ACL check passes.

In Step S25A, the index-object-based S3 migration management module 53 can check whether the ACL check passes. If Yes, Step S25B is entered; if No, Step S25C is entered. For example, when the ACL indicates that the user has the authority of applying the Head-Object request to the object (e.g. the authority of obtaining the result of executing the Head-Object request), the index-object-based S3 migration management module 53 can determine that the ACL check passes. For another example, when the ACL indicates that the user does not have the authority of applying the Head-Object request to the object (e.g. the authority of obtaining the result of executing the Head-Object request), the index-object-based S3 migration management module 53 can determine that the ACL check fails.

In Step S25B, the index-object-based S3 migration management module 53 can control the storage server 10 to return the attributes as recorded in the special attributes of the index object (e.g. the index object mentioned in Step S23) to the user.

In Step S25C, the index-object-based S3 migration management module 53 can control the storage server 10 to prevent from returning the attributes as recorded in the special attributes of the index object (e.g. the index object mentioned in Step S23) to the user.

In Step S26, in response to the bucket being not currently handled in the index stage (e.g. INDEX stage), the index-object-based S3 migration management module 53 can check whether the object (e.g. the target object of the Head-Object request) is still an index object. If Yes, Step S25 (e.g. Step S25A) is entered; if No, Step S27 (e.g. Step S27A) is entered. Regarding the partial working flow between Steps S26 and S27, in the data stage (e.g. DATA stage), all object ACLs have already been migrated, so there is no need to fetch remote object ACL again.

In Step S27, in response to the object (e.g. the target object of the Head-Object request) being not still an index object (e.g. the object becomes a normal object), the index-object-based S3 migration management module 53 can control the storage server 10 to perform at least one normal action according to the Head-Object request. For example, the index-object-based S3 migration management module 53 can control the storage server 10 to selectively return local metadata of the object (e.g. the metadata of the object of the local site) to the user according to whether an associated ACL check passes.

In Step S27A, the index-object-based S3 migration management module 53 can check whether the ACL check passes. If Yes, Step S27B is entered; if No, Step S27C is entered. For example, the operation of Step S27A can be similar to the operation of Step S25A.

In Step S27B, the index-object-based S3 migration management module 53 can control the storage server 10 to return the local metadata of the object to the user.

In Step S27C, the index-object-based S3 migration management module 53 can control the storage server 10 to prevent from returning the local metadata of the object to the user.

In Step S28, the index-object-based S3 migration management module 53 can control the storage server 10 to proxy (e.g. forward) the request such as the Head-Object request to the source/remote site such as the remote S3-compatible server, to make the remote site check the object ACL.

In Step S29, the index-object-based S3 migration management module 53 can control the storage server 10 to proxy (e.g. forward) the response corresponding to the Head-Object request to the user.

In Step S29E, the index-object-based S3 migration management module 53 can control the storage server 10 to return an error notification such as 503 Service Unavailable. For example, this operation can notify the client device to retry later, since the migration agent will migrate ACL in a very short time.

For better comprehension, the method may be illustrated with the working flow shown in FIG. 9, but the present invention is not limited thereto. According to some embodiments, one or more steps may be added, deleted, or changed in the working flow shown in FIG. 9. For example, at least one portion (e.g. a portion or all) of this working flow may be executed multiple times, more particularly, any step comprising a checking operation may be executed multiple times to generate multiple checking results, respectively, to trigger execution of some subsequent steps, respectively.

Figure 10:
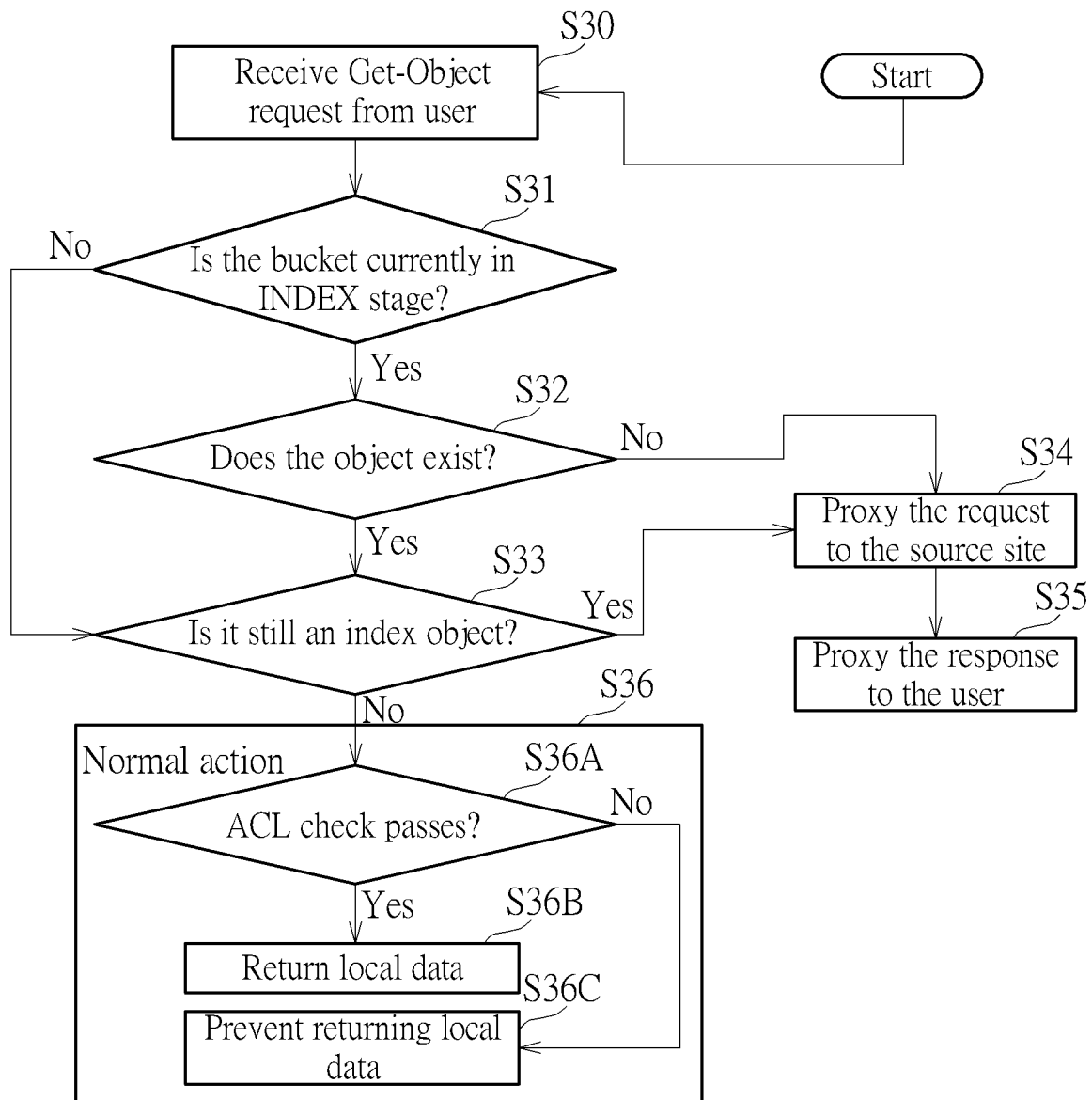
FIG. 10 illustrates a Get-Object control scheme of the method for performing S3 seamless migration using index objects according to an embodiment of the present invention.

FIG. 10 illustrates a Get-Object control scheme of the method for performing S3 seamless migration using index objects according to an embodiment of the present invention. As shown in FIG. 10, a working flow for handling one or more Get-Object requests during the migration of the user data may comprise Steps S30-S36, where Step S36 may comprise some sub-steps such as Steps S36A-S36C.

In Step S30, the storage server 10 (e.g. the index-object-based S3 migration management module 53) can receive a Get-Object request among the one or more Get-Object requests from the user. For example, the Get-Object request is asking for getting object data with attributes, such as the object data of an object in the bucket of the destination as well as the object attributes of the object, and this object can be regarded as a target object of the Get-Object request.

In Step S31, in response to the Get-Object request, the index-object-based S3 migration management module 53 can check whether a bucket corresponding to the Get-Object request among the aforementioned at least one bucket in the storage device layer of the storage server 10, such as the bucket of the destination, is currently handled in the index stage such as the INDEX stage. If Yes, Step S32 is entered; if No, Step S33 is entered.

In Step S32, in response to the bucket being currently handled in the index stage (e.g. INDEX stage), the index-object-based S3 migration management module 53 can check whether the object (e.g. the target object of the Get-Object request) exists. If Yes, Step S33 is entered; if No, Step S34 is entered. Regarding the partial working flow between Steps S32 and S34, examples of the reason why the object does not exist may comprise: the index object is not yet created; and the index object has been deleted by the user.

In Step S33, the index-object-based S3 migration management module 53 can check whether the object (e.g. the target object of the Get-Object request) is still an index object. If Yes, Step S34 is entered; if No, Step S36 (e.g. Step S36A) is entered.

In Step S34, the index-object-based S3 migration management module 53 can control the storage server 10 to proxy (e.g. forward) the request such as the Get-Object request to the source/remote site such as the remote S3-compatible server.

In Step S35, the index-object-based S3 migration management module 53 can control the storage server 10 to proxy (e.g. forward) the response corresponding to the Get-Object request to the user.

In Step S36, in response to the object (e.g. the target object of the Get-Object request) being not still an index object (e.g. the object becomes a normal object), the index-object-based S3 migration management module 53 can control the storage server 10 to perform at least one normal action according to the Get-Object request. For example, the index-object-based S3 migration management module 53 can control the storage server 10 to selectively return local data of the object (e.g. the data of the object of the local site) to the user according to whether an associated ACL check passes.

In Step S36A, the index-object-based S3 migration management module 53 can check whether the ACL check passes. If Yes, Step S36B is entered; if No, Step S36C is entered. For example, when the ACL indicates that the user has the authority of applying the Get-Object request to the object (e.g. the authority of obtaining the result of executing the Get-Object request), the index-object-based S3 migration management module 53 can determine that the ACL check passes. For another example, when the ACL indicates that the user does not have the authority of applying the Get-Object request to the object (e.g. the authority of obtaining the result of executing the Get-Object request), the index-object-based S3 migration management module 53 can determine that the ACL check fails.

In Step S36B, the index-object-based S3 migration management module 53 can control the storage server 10 to return the local data of the object to the user.

In Step S36C, the index-object-based S3 migration management module 53 can control the storage server 10 to prevent from returning the local data of the object to the user.

For better comprehension, the method may be illustrated with the working flow shown in FIG. 10, but the present invention is not limited thereto. According to some embodiments, one or more steps may be added, deleted, or changed in the working flow shown in FIG. 10. For example, at least one portion (e.g. a portion or all) of this working flow may be executed multiple times, more particularly, any step comprising a checking operation may be executed multiple times to generate multiple checking results, respectively, to trigger execution of some subsequent steps, respectively.

Figure 11:
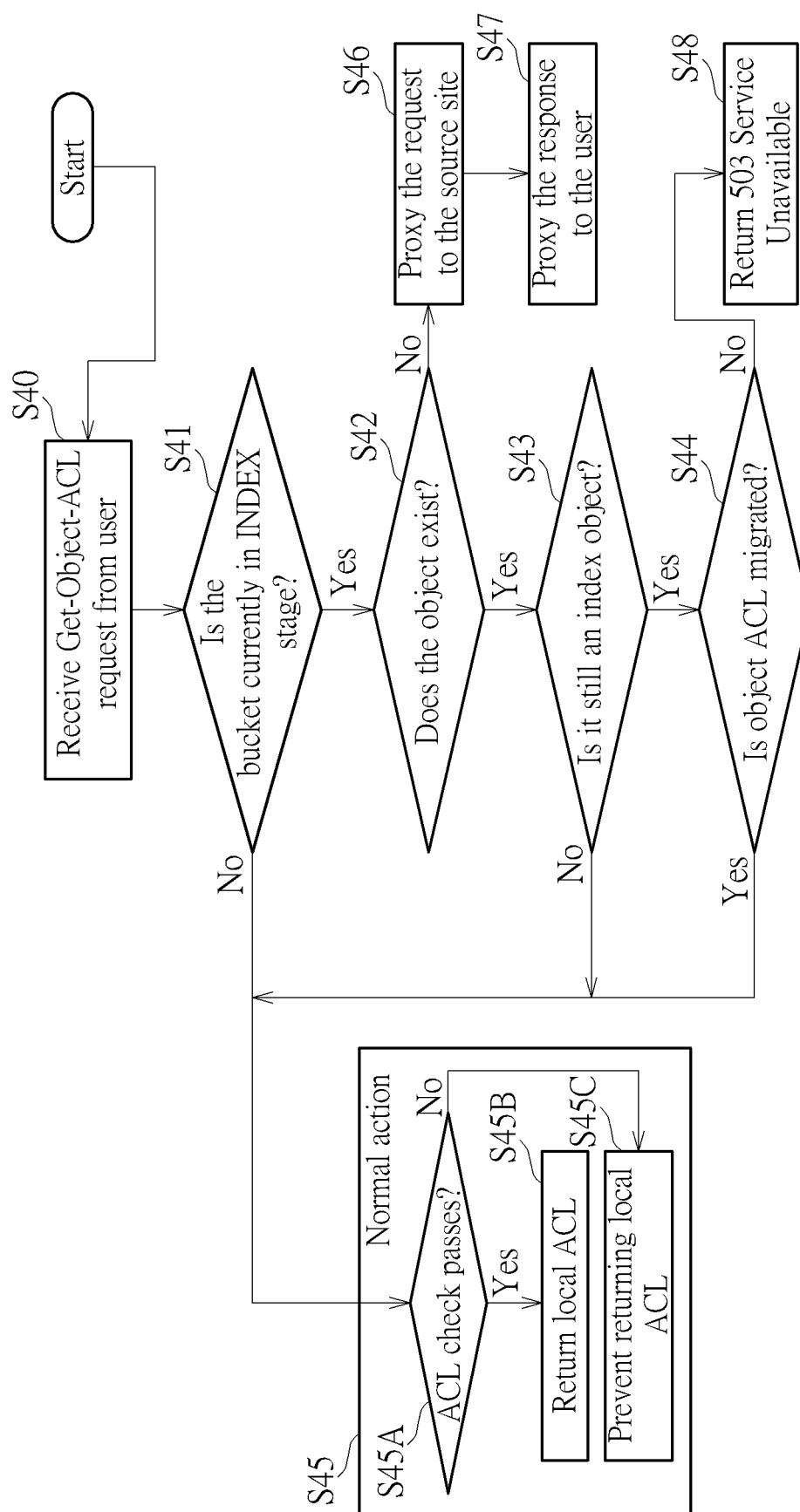
FIG. 11 illustrates a Get-Object-ACL control scheme of the method for performing S3 seamless migration using index objects according to an embodiment of the present invention.

FIG. 11 illustrates a Get-Object-ACL control scheme of the method for performing S3 seamless migration using index objects according to an embodiment of the present invention. As shown in FIG. 11, a working flow for handling one or more Get-Object-ACL requests during the migration of the user data may comprise Steps S40-S48, where Step S45 may comprise some sub-steps such as Steps S45A-S45C.

In Step S40, the storage server 10 (e.g. the index-object-based S3 migration management module 53) can receive a Get-Object-ACL request among the one or more Get-Object-ACL requests from the user. For example, the Get-Object-ACL request is asking for getting object ACL, such as the ACL of an object in the bucket of the destination, and this object can be regarded as a target object of the Get-Object-ACL request.

In Step S41, in response to the Get-Object-ACL request, the index-object-based S3 migration management module 53 can check whether a bucket corresponding to the Get-Object-ACL request among the aforementioned at least one bucket in the storage device layer of the storage server 10, such as the bucket of the destination, is currently handled in the index stage such as the INDEX stage. If Yes, Step S42 is entered; if No, Step S45 (e.g. Step S45A) is entered.

In Step S42, in response to the bucket being currently handled in the index stage (e.g. INDEX stage), the index-object-based S3 migration management module 53 can check whether the object (e.g. the target object of the Get-Object-ACL request) exists. If Yes, Step S43 is entered; if No, Step S46 is entered.

In Step S43, the index-object-based S3 migration management module 53 can check whether the object (e.g. the target object of the Get-Object-ACL request) is still an index object. If Yes, Step S44 is entered; if No, Step S45 (e.g. Step S45A) is entered.

In Step S44, in response to the object being still an index object, the index-object-based S3 migration management module 53 can check whether the object ACL of the object is migrated. If Yes, Step S45 (e.g. Step S45A) is entered; if No, Step S48 is entered.

In Step S45, the index-object-based S3 migration management module 53 can control the storage server 10 to perform at least one normal action according to the Get-Object-ACL request. For example, the index-object-based S3 migration management module 53 can control the storage server 10 to selectively return local ACL of the object (e.g. the ACL of the object of the local site) to the user according to whether an associated ACL check passes.

In Step S45A, the index-object-based S3 migration management module 53 can check whether the ACL check passes. If Yes, Step S45B is entered; if No, Step S45C is entered. For example, when the ACL indicates that the user has the authority of applying the Get-Object-ACL request to the object (e.g. the authority of obtaining the result of executing the Get-Object-ACL request), the index-object-based S3 migration management module 53 can determine that the ACL check passes. For another example, when the ACL indicates that the user does not have the authority of applying the Get-Object-ACL request to the object (e.g. the authority of obtaining the result of executing the Get-Object-ACL request), the index-object-based S3 migration management module 53 can determine that the ACL check fails.

In Step S45B, the index-object-based S3 migration management module 53 can control the storage server 10 to return the local ACL of the object to the user.

In Step S45C, the index-object-based S3 migration management module 53 can control the storage server 10 to prevent from returning the local ACL of the object to the user.

In Step S46, the index-object-based S3 migration management module 53 can control the storage server 10 to proxy (e.g. forward) the request such as the Get-Object-ACL request to the source/remote site such as the remote S3-compatible server.

In Step S47, the index-object-based S3 migration management module 53 can control the storage server 10 to proxy (e.g. forward) the response corresponding to the Get-Object-ACL request to the user.

In Step S48, the index-object-based S3 migration management module 53 can control the storage server 10 to return an error notification such as 503 Service Unavailable.

For better comprehension, the method may be illustrated with the working flow shown in FIG. 11, but the present invention is not limited thereto. According to some embodiments, one or more steps may be added, deleted, or changed in the working flow shown in FIG. 11. For example, at least one portion (e.g. a portion or all) of this working flow may be executed multiple times, more particularly, any step comprising a checking operation may be executed multiple times to generate multiple checking results, respectively, to trigger execution of some subsequent steps, respectively.

Figure 12:
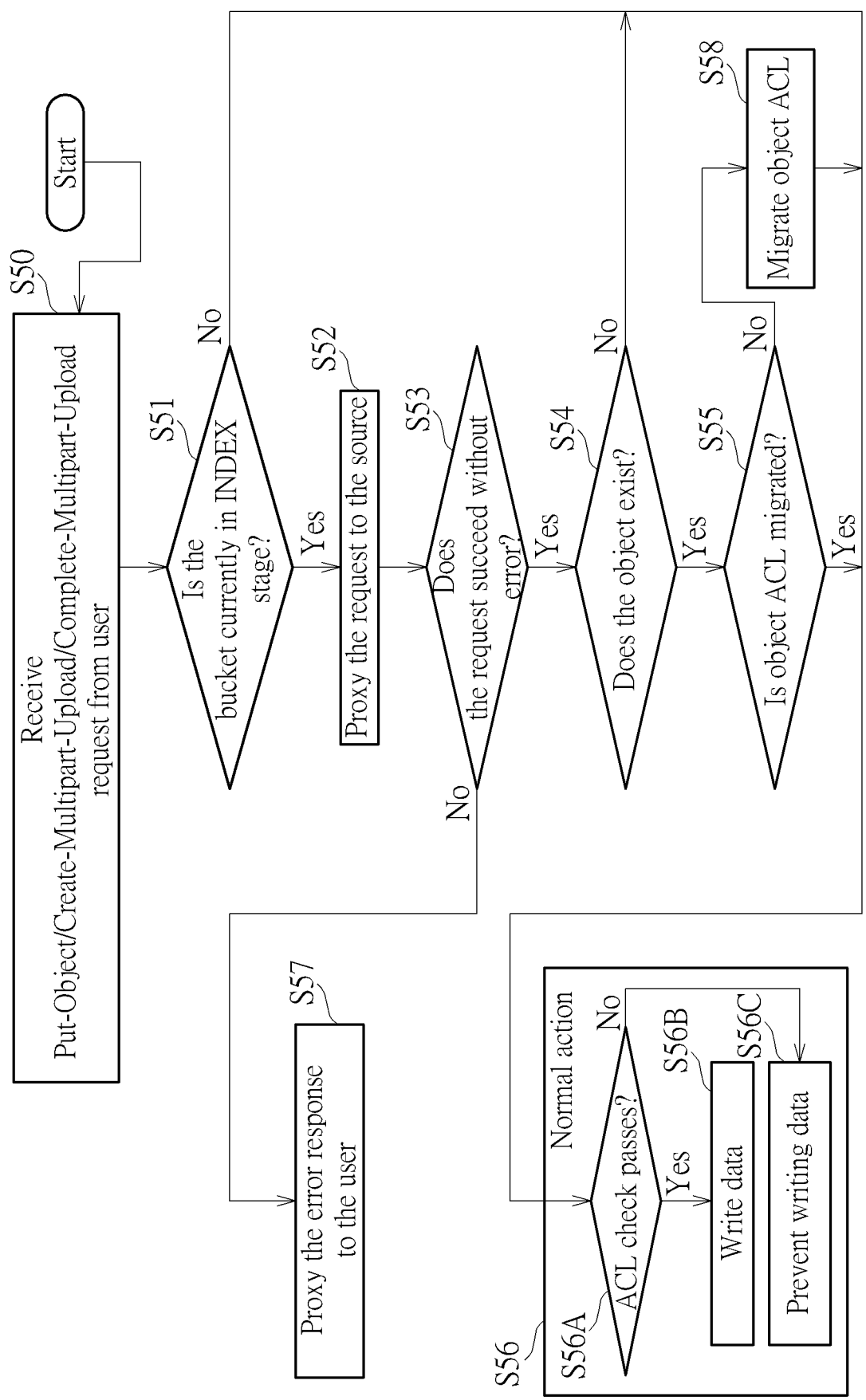
FIG. 12 illustrates a Put-Object control scheme of the method for performing S3 seamless migration using index objects according to an embodiment of the present invention.

FIG. 12 illustrates a Put-Object control scheme of the method for performing S3 seamless migration using index objects according to an embodiment of the present invention. As shown in FIG. 12, a working flow for handling one or more object-data-writing-related requests such as one or more Put-Object requests, one or more Create-Multipart-Upload requests, and one or more Complete-Multipart-Upload requests during the migration of the user data may comprise Steps S50-S58, where Step S56 may comprise some sub-steps such as Steps S56A-S56C.

In Step S50, the storage server 10 (e.g. the index-object-based S3 migration management module 53) can receive an object-data-writing-related request such as a Put-Object/Create-Multipart-Upload/Complete-Multipart-Upload request (e.g. a Put-Object request, a Create-Multipart-Upload request, or a Complete-Multipart-Upload request) among the one or more object-data-writing-related requests (e.g. the one or more Put-Object requests, the one or more Create-Multipart-Upload requests, and the one or more Complete-Multipart-Upload requests) from the user. For example, the object-data-writing-related request is asking for writing object data of an object in the bucket of the destination, and this object can be regarded as a target object of the object-data-writing-related request.

In Step S51, in response to the object-data-writing-related request, the index-object-based S3 migration management module 53 can check whether a bucket corresponding to the object-data-writing-related request among the aforementioned at least one bucket in the storage device layer of the storage server 10, such as the bucket of the destination, is currently handled in the index stage such as the INDEX stage. If Yes, Step S52 is entered; if No, Step S56 (e.g. Step S56A) is entered.

In Step S52, the index-object-based S3 migration management module 53 can control the storage server 10 to proxy (e.g. forward) the request such as the object-data-writing-related request to the source such as the remote S3-compatible server, to make the remote S3-compatible server check the object ACL.

In Step S53, the index-object-based S3 migration management module 53 can check whether the request such as the object-data-writing-related request succeeds without any error. If Yes (e.g. the response received from the source, such as the response corresponding to the object-data-writing-related request, indicates that no error occurs), Step S54 is entered; if No (e.g. the response received from the source, such as the response corresponding to the object-data-writing-related request, is an error response indicating one or more errors), Step S57 is entered.

In Step S54, the index-object-based S3 migration management module 53 can check whether the object (e.g. the target object of the object-data-writing-related request) exists. If Yes, Step S55 is entered; if No, Step S56 (e.g. Step S56A) is entered.

In Step S55, the index-object-based S3 migration management module 53 can check whether the object ACL of the object is migrated. If Yes, Step S56 (e.g. Step S56A) is entered; if No, Step S58 is entered.

In Step S56, the index-object-based S3 migration management module 53 can control the storage server 10 to perform at least one normal action according to the object-data-writing-related request. For example, the index-object-based S3 migration management module 53 can control the storage server 10 to selectively write data (e.g. the object data carried by the object-data-writing-related request) as the object data of the object according to whether an associated ACL check passes.

In Step S56A, the index-object-based S3 migration management module 53 can check whether the ACL check passes. If Yes, Step S56B is entered; if No, Step S56C is entered. For example, when the ACL indicates that the user has the authority of applying the object-data-writing-related request to the object (e.g. the authority of writing the object data carried by the object-data-writing-related request), the index-object-based S3 migration management module 53 can determine that the ACL check passes. For another example, when the ACL indicates that the user does not have the authority of applying the object-data-writing-related request to the object (e.g. the authority of writing the object data carried by the object-data-writing-related request), the index-object-based S3 migration management module 53 can determine that the ACL check fails.

In Step S56B, the index-object-based S3 migration management module 53 can control the storage server 10 to write the data (e.g. the object data carried by the object-data-writing-related request) as the object data of the object.

In Step S56C, the index-object-based S3 migration management module 53 can control the storage server 10 to prevent from writing the data (e.g. the object data carried by the object-data-writing-related request) as the object data of the object.

In Step S57, the index-object-based S3 migration management module 53 can control the storage server 10 to proxy (e.g. forward) the error response corresponding to the object-data-writing-related request to the user.

In Step S58, the index-object-based S3 migration management module 53 can control the storage server 10 to migrate the object ACL of the object from the source to the destination.

For better comprehension, the method may be illustrated with the working flow shown in FIG. 12, but the present invention is not limited thereto. According to some embodiments, one or more steps may be added, deleted, or changed in the working flow shown in FIG. 12. For example, at least one portion (e.g. a portion or all) of this working flow may be executed multiple times, more particularly, any step comprising a checking operation may be executed multiple times to generate multiple checking results, respectively, to trigger execution of some subsequent steps, respectively.

Figure 13:
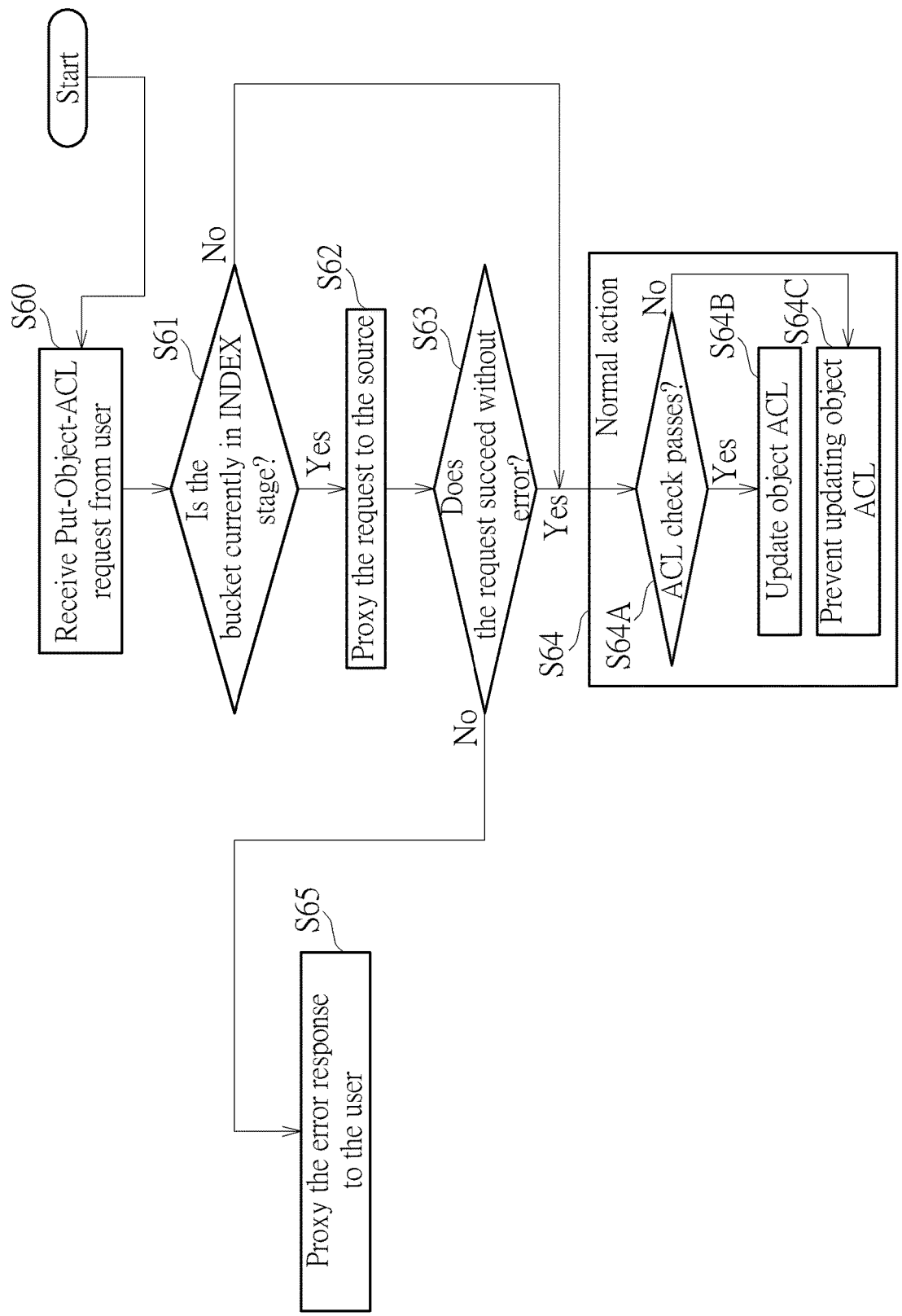
FIG. 13 illustrates a Put-Object-ACL control scheme of the method for performing S3 seamless migration using index objects according to an embodiment of the present invention.

FIG. 13 illustrates a Put-Object-ACL control scheme of the method for performing S3 seamless migration using index objects according to an embodiment of the present invention. As shown in FIG. 13, a working flow for handling one or more Put-Object-ACL requests during the migration of the user data may comprise Steps S60-S65, where Step S64 may comprise some sub-steps such as Steps S64A-S64C.

In Step S60, the storage server 10 (e.g. the index-object-based S3 migration management module 53) can receive a Put-Object-ACL request among the one or more Put-Object-ACL requests from the user. For example, the Put-Object-ACL request is asking for writing or updating object ACL, such as the ACL of an object in the bucket of the destination, and this object can be regarded as a target object of the Put-Object-ACL request.

In Step S61, in response to the Put-Object-ACL request, the index-object-based S3 migration management module 53 can check whether a bucket corresponding to the Put-Object-ACL request among the aforementioned at least one bucket in the storage device layer of the storage server 10, such as the bucket of the destination, is currently handled in the index stage such as the INDEX stage. If Yes, Step S62 is entered; if No, Step S64 (e.g. Step S64A) is entered.

In Step S62, the index-object-based S3 migration management module 53 can control the storage server 10 to proxy (e.g. forward) the request such as the Put-Object-ACL request to the source such as the remote S3-compatible server.

In Step S63, the index-object-based S3 migration management module 53 can check whether the request such as the Put-Object-ACL request succeeds without any error. If Yes (e.g. the response received from the source, such as the response corresponding to the Put-Object-ACL request, indicates that no error occurs), Step S64 (e.g. Step S64A) is entered; if No (e.g. the response received from the source, such as the response corresponding to the Put-Object-ACL request, is an error response indicating one or more errors), Step S65 is entered.

In Step S64, the index-object-based S3 migration management module 53 can control the storage server 10 to perform at least one normal action according to the Put-Object-ACL request. For example, the index-object-based S3 migration management module 53 can control the storage server 10 to selectively update the object ACL (e.g. the ACL of the target object) with new/latest ACL carried by the Put-Object-ACL request according to whether an associated ACL check passes.

In Step S64A, the index-object-based S3 migration management module 53 can check whether the ACL check passes. If Yes, Step S64B is entered; if No, Step S64C is entered. For example, when the ACL indicates that the user has the authority of applying the Put-Object-ACL request to the object (e.g. the authority of writing or updating the object ACL), the index-object-based S3 migration management module 53 can determine that the ACL check passes. For another example, when the ACL indicates that the user does not have the authority of applying the Put-Object-ACL request to the object (e.g. the authority of writing or updating the object ACL), the index-object-based S3 migration management module 53 can determine that the ACL check fails.

In Step S64B, the index-object-based S3 migration management module 53 can control the storage server 10 to update the object ACL (e.g. the ACL of the target object) with the new ACL carried by the Put-Object-ACL request.

In Step S64C, the index-object-based S3 migration management module 53 can control the storage server 10 to prevent from updating the object ACL (e.g. the ACL of the target object) with the new ACL carried by the Put-Object-ACL request.

In Step S65, the index-object-based S3 migration management module 53 can control the storage server 10 to proxy (e.g. forward) the error response corresponding to the Put-Object-ACL request to the user.

For better comprehension, the method may be illustrated with the working flow shown in FIG. 13, but the present invention is not limited thereto. According to some embodiments, one or more steps may be added, deleted, or changed in the working flow shown in FIG. 13. For example, at least one portion (e.g. a portion or all) of this working flow may be executed multiple times, more particularly, any step comprising a checking operation may be executed multiple times to generate multiple checking results, respectively, to trigger execution of some subsequent steps, respectively.

Figure 14:
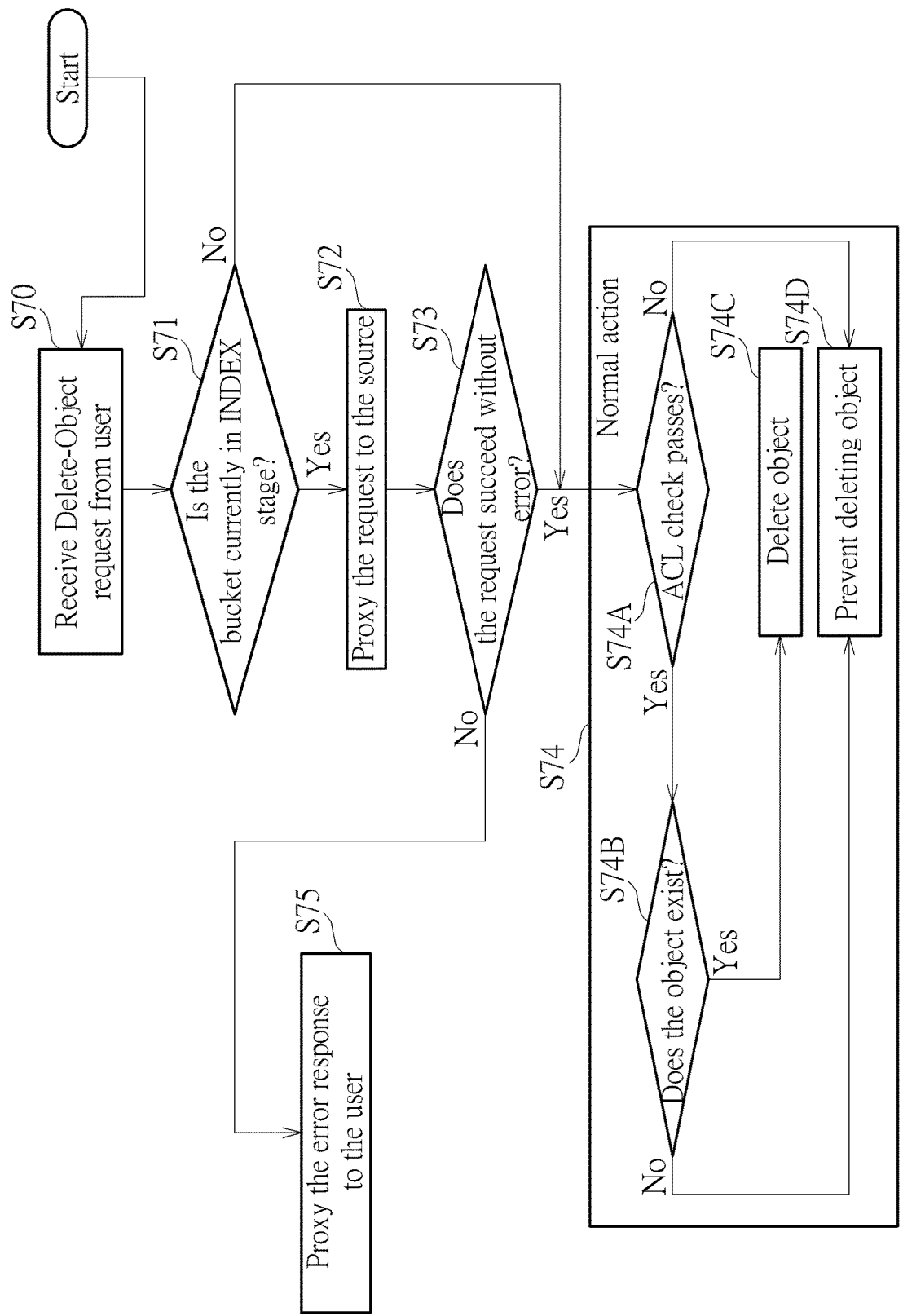
FIG. 14 illustrates a Delete-Object control scheme of the method for performing S3 seamless migration using index objects according to an embodiment of the present invention.

FIG. 14 illustrates a Delete-Object control scheme of the method for performing S3 seamless migration using index objects according to an embodiment of the present invention. As shown in FIG. 14, a working flow for handling one or more Delete-Object requests during the migration of the user data may comprise Steps S70-S75, where Step S74 may comprise some sub-steps such as Steps S74A-S74D.

In Step S70, the storage server 10 (e.g. the index-object-based S3 migration management module 53) can receive a Delete-Object request among the one or more Delete-Object requests from the user. For example, the Delete-Object request is asking for deleting an object in the bucket of the destination, and this object can be regarded as a target object of the Delete-Object request.

In Step S71, in response to the Delete-Object request, the index-object-based S3 migration management module 53 can check whether a bucket corresponding to the Delete-Object request among the aforementioned at least one bucket in the storage device layer of the storage server 10, such as the bucket of the destination, is currently handled in the index stage such as the INDEX stage. If Yes, Step S72 is entered; if No, Step S74 (e.g. Step S74A) is entered.

In Step S72, the index-object-based S3 migration management module 53 can control the storage server 10 to proxy (e.g. forward) the request such as the Delete-Object request to the source such as the remote S3-compatible server.

In Step S73, the index-object-based S3 migration management module 53 can check whether the request such as the Delete-Object request succeeds without any error. If Yes (e.g. the response received from the source, such as the response corresponding to the Delete-Object request, indicates that no error occurs), Step S74 (e.g. Step S74A) is entered; if No (e.g. the response received from the source, such as the response corresponding to the Delete-Object request, is an error response indicating one or more errors), Step S75 is entered.

In Step S74, the index-object-based S3 migration management module 53 can control the storage server 10 to perform at least one normal action according to the Delete-Object request. For example, the index-object-based S3 migration management module 53 can control the storage server 10 to selectively delete the object (e.g. the target object) at least according to whether an associated ACL check passes. For another example, the index-object-based S3 migration management module 53 can control the storage server 10 to selectively delete the object (e.g. the target object) at least according to whether the object exists. Preferably, the index-object-based S3 migration management module 53 can control the storage server 10 to selectively delete the object (e.g. the target object) according to whether both of a first condition and a second condition are satisfied, where the first condition represents that the ACL check passes, and the second condition represents that the object exists.

In Step S74A, the index-object-based S3 migration management module 53 can check whether the ACL check passes. If Yes, Step S74B is entered; if No, Step S74D is entered. For example, when the ACL indicates that the user has the authority of applying the Delete-Object request to the object (e.g. the authority of deleting the object), the index-object-based S3 migration management module 53 can determine that the ACL check passes. For another example, when the ACL indicates that the user does not have the authority of applying the Delete-Object request to the object (e.g. the authority of deleting the object), the index-object-based S3 migration management module 53 can determine that the ACL check fails.

In Step S74B, the index-object-based S3 migration management module 53 can check whether the object (e.g. the target object of the Delete-Object request) exists. If Yes, Step S74C is entered; if No, Step S74D is entered.

In Step S74C, the index-object-based S3 migration management module 53 can control the storage server 10 to delete the object (e.g. the target object).

In Step S74D, the index-object-based S3 migration management module 53 can control the storage server 10 to prevent from deleting the object (e.g. the target object).

In Step S75, the index-object-based S3 migration management module 53 can control the storage server 10 to proxy (e.g. forward) the error response corresponding to the Delete-Object request to the user.

For better comprehension, the method may be illustrated with the working flow shown in FIG. 14, but the present invention is not limited thereto. According to some embodiments, one or more steps may be added, deleted, or changed in the working flow shown in FIG. 14. For example, at least one portion (e.g. a portion or all) of this working flow may be executed multiple times, more particularly, any step comprising a checking operation may be executed multiple times to generate multiple checking results, respectively, to trigger execution of some subsequent steps, respectively. In addition, as a combination of Steps S74A and S74B can be utilized for checking whether both of the first condition and the second condition are satisfied, the conditions respectively checked by Steps S74A and S74B can be exchanged. For example, the index-object-based S3 migration management module 53 can check whether the second condition is satisfied in Step S74A and check whether the first condition is satisfied in Step S74B. If both of the first condition and the second condition are satisfied (e.g. the ACL check passes and the object exists), Step S74C is entered; otherwise, Step S74D is entered.

TABLE 1

|  | Index stage | Data stage |
| --- | --- | --- |
| GET object | Proxy if object does not exist or has "src-mtime" | Proxy if object has "src-mtime" |
| GET object ACLs; HEAD object | Proxy if object does not exist | Allow |
| PUT object ACLs | Proxy, and write to local as well | Allow |
| DELETE object | Proxy, and delete local object as well (if exists) | Allow |
| List objects | Proxy | Allow |
| Upload object | Proxy, and write to local as well | Allow |

Table 1 illustrates some examples of brief behaviors of RGW actions of the storage server 10 in the index stage (e.g. INDEX stage) and the data stage (e.g. DATA stage), where requests such as GET object, GET object ACLs, HEAD object, PUT object ACLs, DELETE object, List objects, and Upload object (as listed in the leftmost of Table 1) represent the one or more Get-Object requests, the one or more Get-Object-ACL requests, the one or more Head-Object requests, the one or more Put-Object-ACL requests, the one or more Delete-Object requests, the one or more List-Objects requests, and the one or more object-data-writing-related requests (e.g. the one or more Put-Object requests, the one or more Create-Multipart-Upload requests, and the one or more Complete-Multipart-Upload requests), respectively. Under control of the index-object-based S3 migration management module 53, the storage server 10 can operate correctly and efficiently. For better comprehension, some operations described in the above embodiments can be briefly summarized in the fields "Index stage" and "Data stage" of Table 1.

For example, in the index stage, when the any other request represents the Get-Object request, the storage server 10 can proxy this request to the source if the target object does not exist or has the last-modified-time (e.g. "src-mtime"); when the any other request represents any of the Get-Object-ACL request and the Head-Object request, the storage server 10 can proxy this request to the source if the target object does not exist; when the any other request represents the Put-Object-ACL request, the storage server 10 can proxy this request to the source, and write the object ACL carried by this request to the local site (e.g. the destination such as the storage server 10) as well; when the any other request represents the Delete-Object request, the storage server 10 can proxy this request to the source, and delete the local object such as the target object as well if the target object exists; when the any other request represents the List-Objects request, the storage server 10 can proxy this request to the source; and when the any other request represents the object-data-writing-related request (e.g. the Put-Object request, the Create-Multipart-Upload request, or the Complete-Multipart-Upload request), the storage server 10 can proxy this request to the source, and write the object data carried by this request to the local site (e.g. the destination such as the storage server 10) as well. In the data stage, when the any other request represents the Get-Object request, the storage server 10 can proxy this request if the target object has the last-modified-time (e.g. "src-mtime"); and when the any other request represents any of the remaining requests among all of these requests, the storage server 10 can allow the associated processing of this request, having no need to proxy the request to the source.

As the index stage merely takes a short time, and as the index-object-based S3 migration management module 53 can properly control the storage server 10 with aid of various control schemes of the method during the migration of the user data, the storage server 10 can perform S3 seamless migration regarding private clouds (e.g. S3 seamless migration from any public/private cloud to a private cloud) with ease, to allow the user to access data normally and smoothly during data migration. Under control of the index-object-based S3 migration management module 53, the storage server 10 can correctly migrate the user data while properly handling the any other request (if exists), and therefore will not generate any erroneous data (e.g. erroneous data due to incorrect migration management of the related art, typically found in a situation where user(s) change (e.g. write, overwrite, delete, etc.) something during migration), thereby making the migration of the user data seamless. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing Simple Storage Service (S3) seamless migration using index objects, the method being applied to a storage server, the method comprising:
in response to a request of migrating user data of a user of the storage server from a remote S3-compatible server into the storage server, during an index stage among multiple stages of the migration of the user data, utilizing an index-object-based S3 migration management module among multiple program modules running on a host device within the storage server to create and store multiple index objects into a storage device layer of the storage server to be respective representatives of multiple normal objects of the user data at the storage server, and migrate respective Access Control Lists (ACLs) of the multiple normal objects to the storage server to be respective ACLs of the multiple index objects, for minimizing probability of any change of any normal object of the multiple normal objects affecting correctness of the migration of the user data, wherein the storage server comprises the host device and the storage device layer, the storage device layer comprises at least one storage device that is coupled to the host device, the host device is arranged to control operations of the storage server, and said at least one storage device is arranged to store information for the storage server; and
during a data stage after the index stage among the multiple stages, utilizing the index-object-based S3 migration management module to trigger one or more migration agents to migrate respective object data of a set of normal objects among the multiple normal objects from the remote S3-compatible server into the storage device layer of the storage server as respective replacements of a set of index objects among the multiple index objects, for completing the migration of the user data.

2. The method of claim 1, further comprising:
in response to the request of migrating the user data from the remote S3-compatible server into the storage server, during a set-up stage before the index stage among the multiple stages, utilizing the index-object-based S3 migration management module to perform pre-processing of the migration of the user data.

3. The method of claim 2, wherein the pre-processing comprises switching at least one endpoint for accessing the user data from at least one cluster of the remote S3-compatible server to at least one cluster of the storage server.

4. The method of claim 1, wherein the respective ACLs of the multiple normal objects are migrated to the storage server to be the respective ACLs of the multiple index objects, as if the multiple index objects are the multiple normal objects, for minimizing probability of any change of any normal object of the multiple normal objects affecting correctness of the migration of the user data.

5. The method of claim 1, wherein a working flow for handling one or more List-Objects requests during the migration of the user data comprises:
receiving a List-Objects request among the one or more List-Objects requests from the user;
in response to the List-Objects request, checking whether a bucket corresponding to the List-Objects request among at least one bucket in the storage device layer is currently handled in the index stage, wherein the at least one bucket represents at least one container for objects; and
in response to the bucket being currently handled in the index stage, controlling the storage server to proxy the List-Objects request to the remote S3-compatible server.

6. The method of claim 5, wherein the working flow for handling the one or more List-Objects requests during the migration of the user data further comprises:
after controlling the storage server to proxy the List-Objects request to the remote S3-compatible server, controlling the storage server to proxy a response corresponding to the List-Objects from the remote S3-compatible server to the user.

7. The method of claim 5, wherein the step of checking whether the bucket is currently handled in the index stage is executed multiple times to generate a first checking result and a second checking result, respectively, wherein the first checking result indicates that the bucket is currently handled in the index stage, and the second checking result indicates that the bucket is not currently handled in the index stage; the step of controlling the storage server to proxy the List-Objects request to the remote S3-compatible server is executed in response to the first checking result; and the working flow for handling the one or more List-Objects requests during the migration of the user data further comprises:
 in response to the second checking result, controlling the storage server to perform at least one normal action according to the List-Objects request, having no need to proxy the List-Objects request to the remote S3-compatible server.

8. The method of claim 7, wherein the at least one normal action comprises:
 controlling the storage server to selectively return a local List-Objects result to the user according to whether an associated ACL check passes, wherein if the associated ACL check passes, the storage server returns the local List-Objects result to the user, otherwise, the storage server prevents from returning the local List-Objects result to the user.

9. The method of claim 1, wherein a working flow for handling one or more Head-Object requests during the migration of the user data comprises:
 receiving a Head-Object request among the one or more Head-Object requests from the user;
 in response to the Head-Object request, checking whether a bucket corresponding to the Head-Object request among at least one bucket in the storage device layer is currently handled in the index stage, wherein the at least one bucket represents at least one container for objects;
 in response to the bucket being currently handled in the index stage, checking whether a target object of the Head-Object request exists;
 in response to existence of the target object, checking whether the target object is still an index object; and
 in response to the target object being still the index object, checking whether an object ACL of the target object is migrated to the storage server, for selectively perform at least one predetermined action according to the Head-Object request, having no need to proxy the Head-Object request to the remote S3-compatible server.

10. The method of claim 9, wherein the at least one predetermined action comprises:
 controlling the storage server to selectively return attributes as recorded in temporary attributes of the index object to the user according to whether an associated ACL check passes, wherein if the associated ACL check passes, the storage server returns the attributes as recorded in the temporary attributes of the index object to the user, otherwise, the storage server prevents from returning the attributes as recorded in the temporary attributes of the index object to the user.

11. The method of claim 1, wherein a working flow for handling one or more Get-Object requests during the migration of the user data comprises:
 receiving a Get-Object request among the one or more Get-Object requests from the user;
 in response to the Get-Object request, checking whether a bucket corresponding to the Get-Object request among at least one bucket in the storage device layer is currently handled in the index stage, wherein the at least one bucket represents at least one container for objects;
 in response to the bucket being currently handled in the index stage, checking whether a target object of the Get-Object request exists;
 in response to existence of the target object, checking whether the target object is still an index object; and in response to the target object being not still the index object, controlling the storage server to perform at least one normal action according to the Get-Object request, having no need to proxy the Get-Object request to the remote S3-compatible server.

12. The method of claim 11, wherein the at least one normal action comprises:
 controlling the storage server to selectively return local data of the target object to the user according to whether an associated ACL check passes, wherein if the associated ACL check passes, the storage server returns the local data to the user, otherwise, the storage server prevents from returning the local data to the user, wherein the local data represents object data of the target object in the storage server.

13. The method of claim 1, wherein a working flow for handling one or more Get-Object-ACL requests during the migration of the user data comprises:
 receiving a Get-Object-ACL request among the one or more Get-Object-ACL requests from the user;
 in response to the Get-Object-ACL request, checking whether a bucket corresponding to the Get-Object-ACL request among at least one bucket in the storage device layer is currently handled in the index stage, wherein the at least one bucket represents at least one container for objects;
 in response to the bucket being currently handled in the index stage, checking whether a target object of the Get-Object-ACL request exists;
 in response to existence of the target object, checking whether the target object is still an index object; and
 in response to the target object being still the index object, checking whether an object ACL of the target object is migrated to the storage server, for selectively perform at least one normal action according to the Get-Object-ACL request, having no need to proxy the Get-Object-ACL request to the remote S3-compatible server.

14. The method of claim 13, wherein the at least one normal action comprises:
 controlling the storage server to selectively return a local ACL of the target object to the user according to whether an associated ACL check passes, wherein if the associated ACL check passes, the storage server returns the local ACL to the user, otherwise, the storage server prevents from returning the local ACL to the user, wherein the local ACL represents an ACL of the target object in the storage server.

15. The method of claim 1, wherein the storage server is implemented as a private cloud, and the remote S3-compatible server is implemented as a public cloud or another private cloud.

16. A host device, comprising:
 a processing circuit, arranged to control the host device to perform index-object-based S3 migration management in a storage server, wherein the storage server comprises the host device and a storage device layer, the storage device layer comprises at least one storage device that is coupled to the host device, the host device is arranged to control operations of the storage server, and said at least one storage device is arranged to store information for the storage server, wherein:
 in response to a request of migrating user data of a user of the storage server from a remote S3-compatible server into the storage server, during an index stage among multiple stages of the migration of the user data, an index-object-based S3 migration management module among multiple program modules running on the processing circuit creates and stores multiple index objects into the storage device layer to be respective representatives of multiple normal objects of the user data at the storage server, and migrates respective Access Control Lists (ACLs) of the multiple normal objects to the storage server to be respective ACLs of the multiple index objects, for minimizing probability of any change of any normal object of the multiple normal objects affecting correctness of the migration of the user data; and during a data stage after the index stage among the multiple stages, the index-object-based S3 migration management module triggers one or more migration agents to migrate respective object data of a set of normal objects among the multiple normal objects from the remote S3-compatible server into the storage device layer of the storage server as respective replacements of a set of index objects among the multiple index objects, for completing the migration of the user data.

17. The host device of claim 16, further comprising:
a casing, arranged to install multiple components of the host device and said at least one storage device, wherein the multiple components of the host device comprise the processing circuit.

18. A storage server, comprising:
a host device, arranged to control operations of the storage server, the host device comprising:
 a processing circuit, arranged to control the host device to perform index-object-based S3 migration management in the storage server; and a storage device layer, comprising:
 at least one storage device, coupled to the host device, arranged to store information for the storage server;
wherein:
 in response to a request of migrating user data of a user of the storage server from a remote S3-compatible server into the storage server, during an index stage among multiple stages of the migration of the user data, an index-object-based S3 migration management module among multiple program modules running on the processing circuit creates and stores multiple index objects into the storage device layer to be respective representatives of multiple normal objects of the user data at the storage server, and migrates respective Access Control Lists (ACLs) of the multiple normal objects to the storage server to be respective ACLs of the multiple index objects, for minimizing probability of any change of any normal object of the multiple normal objects affecting correctness of the migration of the user data; and during a data stage after the index stage among the multiple stages, the index-object-based S3 migration management module triggers one or more migration agents to migrate respective object data of a set of normal objects among the multiple normal objects from the remote S3-compatible server into the storage device layer of the storage server as respective replacements of a set of index objects among the multiple index objects, for completing the migration of the user data.

* * * * *